DATA PROCESSOR CONTROL UTILIZING TANDEM SIGNAL OPERATIONS

Filed Dec. 30, 1964 7 Sheets-Sheet 1

INVENTORS: A.W. KETTLEY
W. B. MACURDY
D. MUIR III
U. K. STAGG, JR.

BY Charles Scott Phelan
ATTORNEY

Feb. 20, 1968 A. W. KETTLEY ET AL 3,370,274

DATA PROCESSOR CONTROL UTILIZING TANDEM SIGNAL OPERATIONS

Filed Dec. 30, 1964 7 Sheets-Sheet 2

FIG. 6
| ACTION | LA1 | LB1 |
|---|---|---|
| SUB | 1 | 1 |
| AND | 0 | 1 |
| OR | 0 | 0 |
| EXOR | 1 | 0 |
FIG. 7
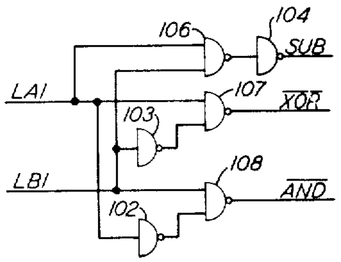
FIG. 12
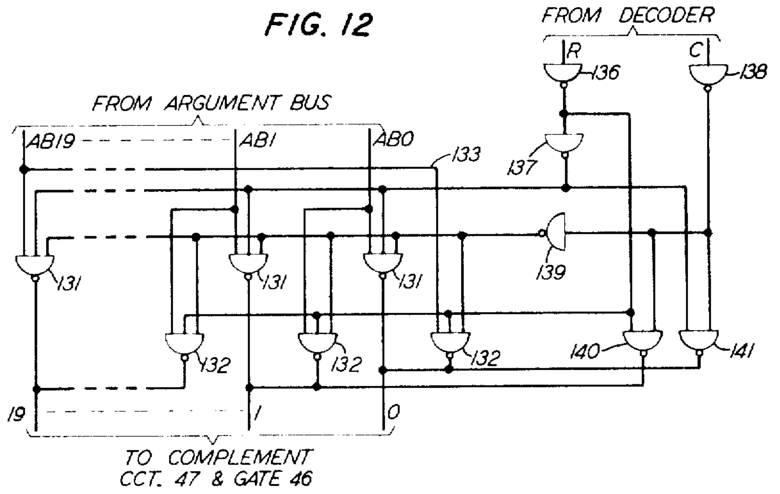
FIG. 8
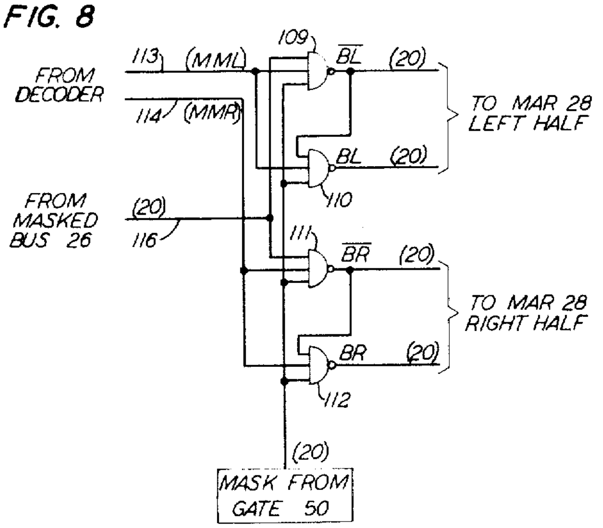

United States Patent Office 3,370,274
Patented Feb. 20, 1968

3,370,274

DATA PROCESSOR CONTROL UTILIZING TANDEM SIGNAL OPERATIONS

Arthur W. Kettley, Middletown, and William B. Macurdy, Fair Haven, N.J., and David Muir III, and Uberto K. Stagg, Jr., Columbus, Ohio, assignors to Bell Telephone Laboratories, Incorporated, New York, N.Y., a corporation of New York Filed Dec. 30, 1964, Ser. No. 422,313
25 Claims. (Cl. 340—172.5)

ABSTRACT OF THE DISCLOSURE

Plural processing operations are performed in tandem, in bit-parallel fashion, on a multibit electric signal, in a single pass through a common, multibit, signal transmission circuit. The processor includes arrangements for modifying the characteristics of the plural tandem operations in accordance with a predetermined program of instruction. Multiple general purpose registers are selectably connectable to either the input or the output of the transmission circuit to provide temporary storage during data processing operations. Details of shifting, masking, and logic circuits for use in tandem operations, as well as a mask deriving circuit, are indicated.

This invention relates to a data processing machine, and it relates more particularly to such a machine which utilizes multifunction signal operation circuits.

In stored program data processing machines an instruction program is written to control machine operation and the program is assembled in memory associated with the machine. Each instruction is decoded in sequence, or in some order that may be determined by the machine operating results, to obtain electrical signals for fixing the operation of the machine circuits. Sequencing circuits are usually provided to cooperate with the decoded instruction signals for causing such machine circuits to be operated in a predetermined timing order.

It is known in the data processing art to treat multibit data words in bit-parallel fashion, at the expense of additional hardware, in order to save processing time. Processing apparatus for this purpose normally includes various circuits for performing different logic and routine manipulative steps which are necessary to accomplish the desired processing objectives. For example, the logic circuits may include various functions such as add, subtract, AND, OR, and EXCLUSIVE OR. Manipulative circuits may include such functions as shifting, rotating, and masking.

Heretofore the various logic and manipulative functions have been performed in circuits which are essentially separate from one another in order to lend flexibility to the apparatus and thereby facilitate the task of the programmer. For example, several different transfers, or subcycles of information movement, from storage means to particular operation circuits and back to storage means might be required in order to shift the bit position alignment of the bits in a word, mask out certain portions of the word, and perform a logical operation upon the remaining portions of the word. The programmer selects the necessary subcycles to accomplish the desired end objectives and utilizes them in succession. His machine sequencing circuits set up each new operation subcycle while the information is in storage between subcycles. The repeated shuffling of information in this fashion is redundant, requires substantial hardware, and creates opportunity for faults to occur. Furthermore, the power of each instruction written for the apparatus is limited in terms of the optional operations that can be specified.

Because of the previously described nature of prior art processing machine operations, such machines usually accommodate readily only those information words with a fixed character size. If a different character size is to be processed, a sequence of registration, masking, shifting, and reregistration is usually required before the processing of the character can begin. Each operation in such sequence usually requires a separate phase of machine operation and thereby adds materially to the time required to complete processing.

It is one object of the present invention to improve the efficiency of data processing operations.

It is another object to reduce the frequency with which particular data is moved between storage and operating circuits in order to perform a given processing function.

Yet another object is to increase the real time information processing capacity of a data processor in order to reduce the amount of over-all storage capacity required in the processor.

A further object is to facilitate the processing of information bit groups of less-than-word size.

It is another object to facilitate the processing of data bit groups of variable size.

These and other objects of the invention are realized in a data processing machine in which plural processing operations are performed in tandem, in bit-parallel fashion, on a multibit electric signal, in a single pass through a common, multibit, signal transmission circuit. The processor includes arrangements for modifying the characteristics of the plural tandem operations in accordance with a predetermined program of instructions. The circuits for performing the tandem operations are arranged in the common circuit between the main processor memory and temporary storage registers provided in the processor. Thus, plural manipulative and logical operations can be performed on an information bit group on each pass through the common transmission channel.

It is one feature of the invention that plural data processing operations are advantageously performed on an information signal each time that the signal is passed from a main processing machine memory to temporary storage and each time that it is returned to the memory.

It is another feature that one of the operating circuits is a combinational bit transposition circuit employed to shift or rotate the bits of a signal across the bit transmission paths of a multibit transmission circuit during transmission therethrough. The term "combinational" is herein used to identify circuits with plural inputs and no memory so that the circuit output is changed upon removal of one or more of the plural inputs.

Still another feature of the invention is that bit masking is accomplished over variously-sized bit groups in the output of the shift or rotate circuit by selectable connections for inhibiting certain bit transmission paths.

Another feature is that the aforementioned shift or rotate circuit is combined with masking means in tandem in the common signal operation circuit to facilitate the processing of variously-sized bit groups of less-than-word size.

Yet another feature is that at least two of the temporary storage registers are accumulator registers which are selectably operable in conjunction with the single tandem operation circuit.

A further feature is that the combination of plural accumulators and a common transmission circuit for tandem operations is utilized for conventional arithmetic accumulator purposes for data as well as specialized functions such as address indexing and incrementing indices and addresses.

An additional feature is that ones complement arithmetic is employed for arithmetic operations so that the full bit capacity of the processing word size, including sign bit, is available for specifying addresses in memory.

Another feature is that plural selectable accumulating registers are utilized to make it possible to program the data processor to follow plural nested subroutines by utilizing a different register for interim accumulator contents of each of the nested subroutines.

A complete understanding of the invention and its various features, objects, and advantages may be obtained from the following detailed description when taken together with the appended claims and the attached drawing in which:

Figure 2:
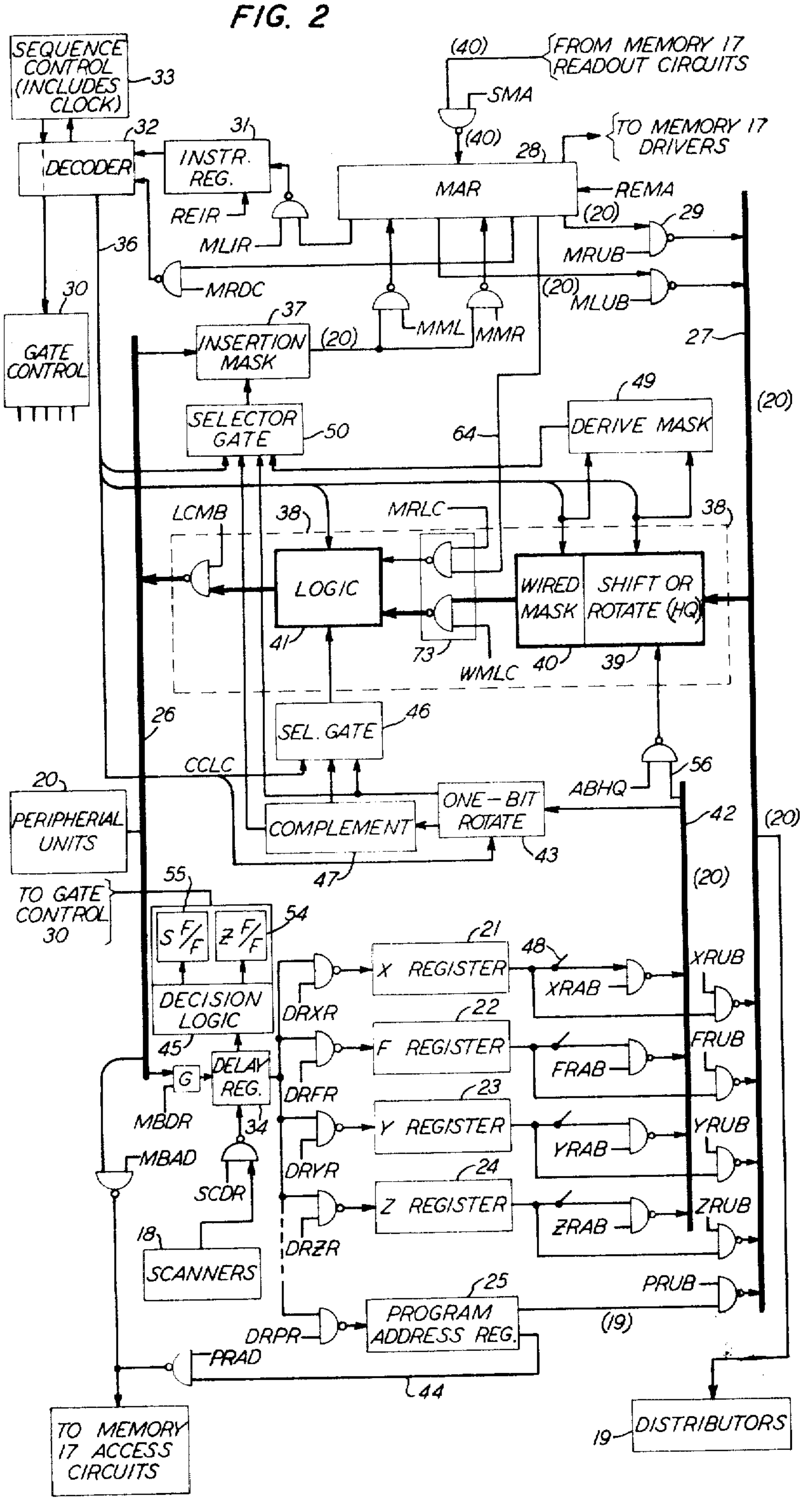
FIG. 2 is a block and line diagram of the main control circuits in the central processor of FIG. 1.
Figures 5A, 5C:
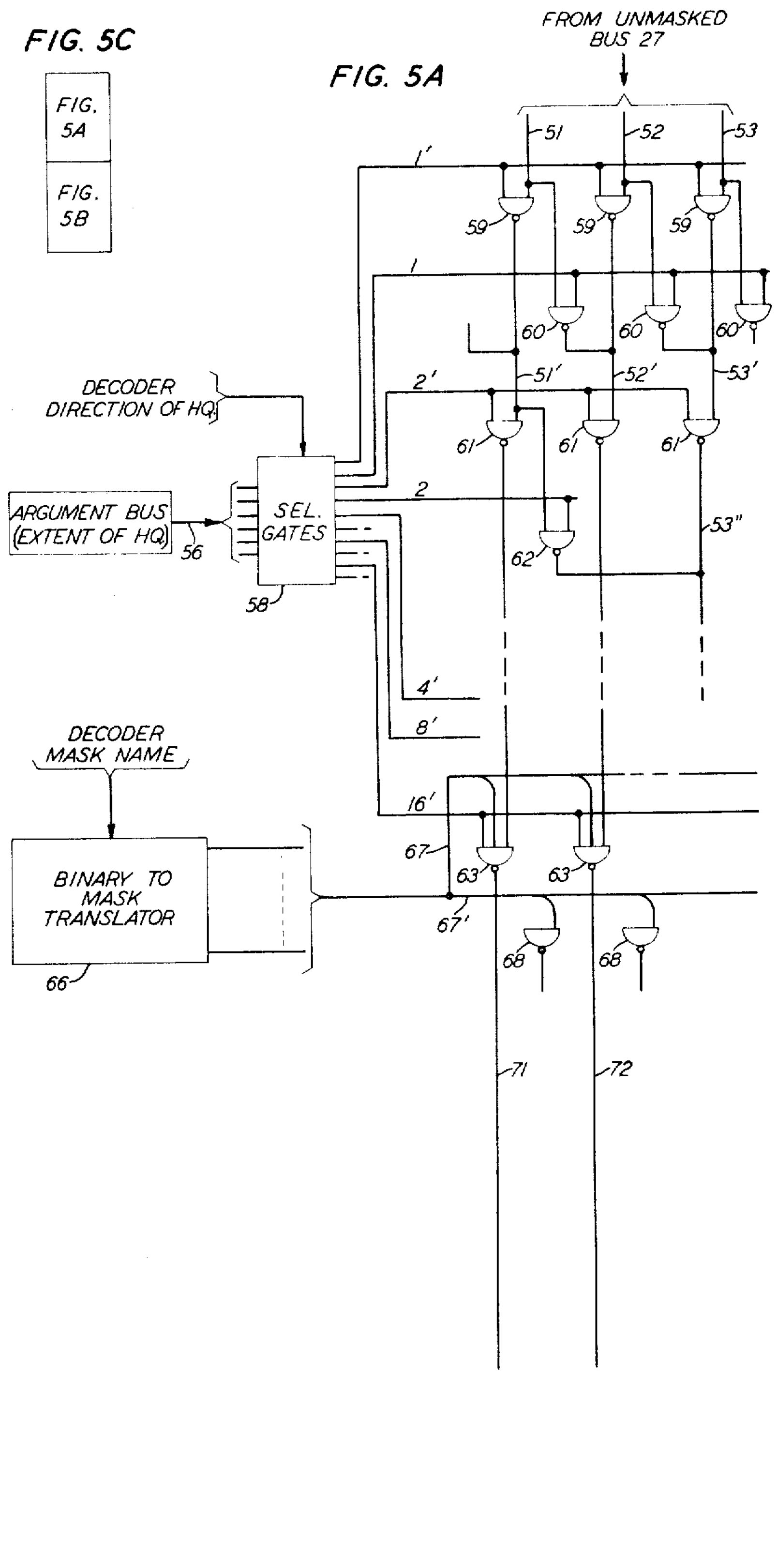
Figure 5B:
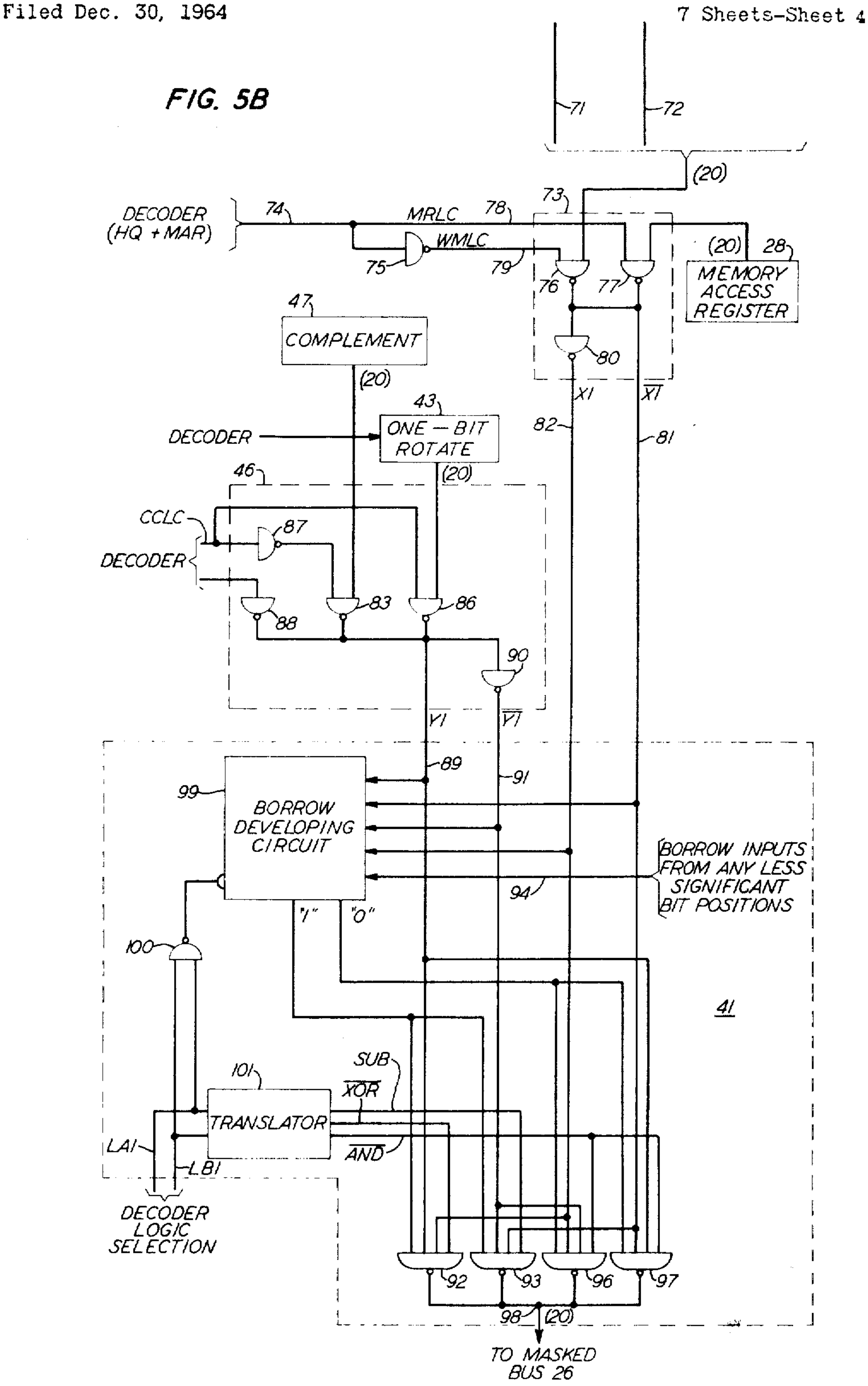
Figure 9:
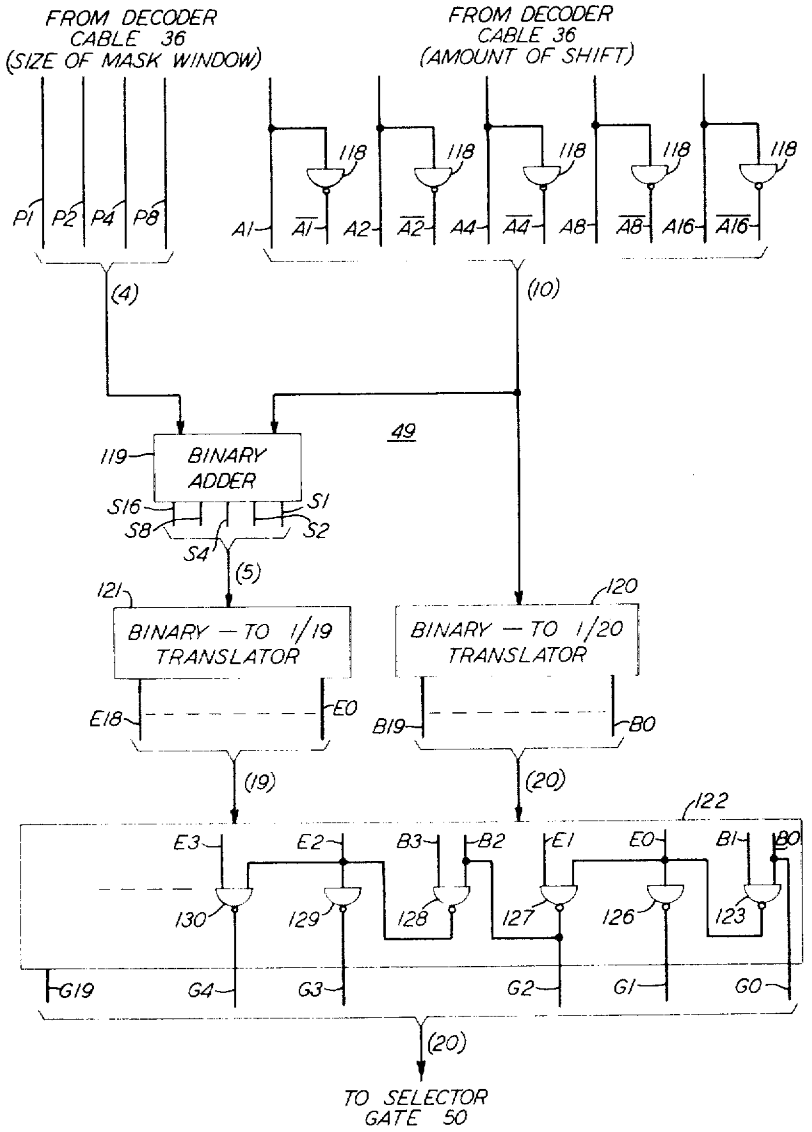
Figures 10, 11:
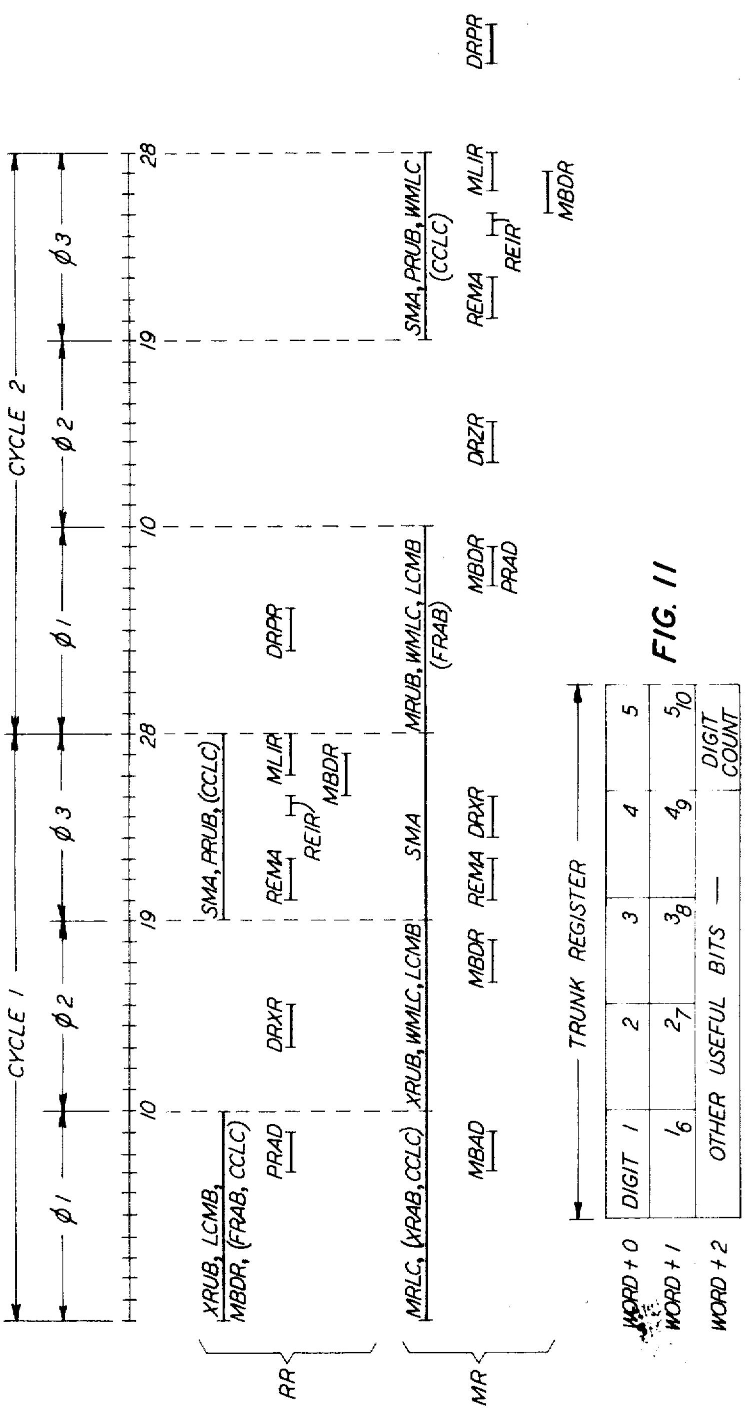

FIGS. 5A and 5B, when combined as shown in FIG. 5C, comprise a diagram partially in schematic form and partially in block and line form of a portion of the circuit of FIG. 2;

FIG. 6 is a truth table for the selection of logic functions in the circuit of FIG. 5B;

FIG. 7 is a schematic diagram of the logic selection translator of FIG. 5B;

FIG. 8 is a schematic diagram of the insertion mask circuit of FIG. 2;

FIG. 9 is a diagram of the mask deriving circuit of FIG. 2;

FIG. 10 includes timing diagrams illustrating the operation of the circuit of FIG. 2;

FIG. 11 is a schematic representation of a portion of the processor memory; and

FIG. 12 is a diagram of the one-bit rotate circuit of FIG. 2.

*System application*

Figure 1:
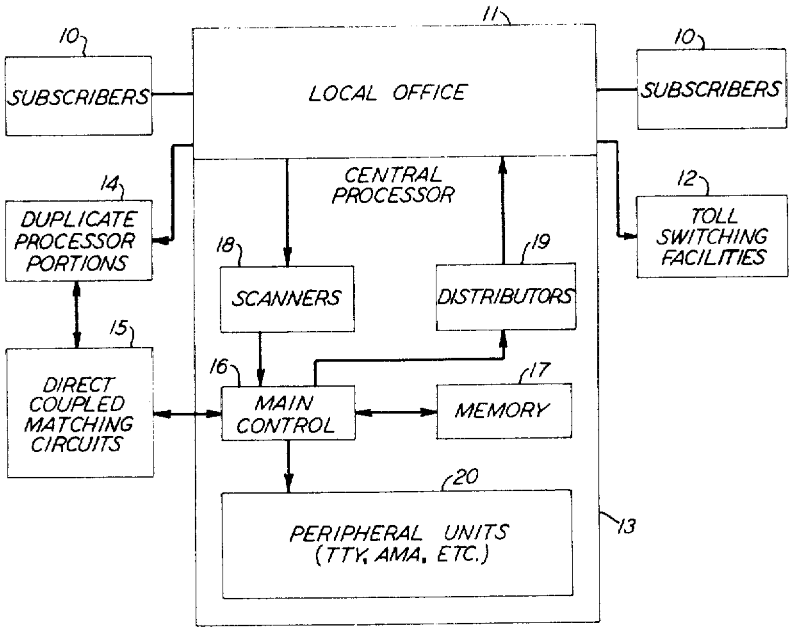
FIG. 1 is a simplified functional block and line diagram of a telephone system utilizing the present invention.

In FIG. 1 individual telephone subscribers 10 are connected to a local telephone switching office 11 for establishing selectable interconnections among such subscribers and for connecting such subscribers to toll switching facilities 12. The operation of the local office is advantageously controlled automatically by electronic means in the form of a central processor 13 which continuously cycles through a basic stored program that detects changes in input signal conditions to the local office, initiates appropriate requested connections, and conducts certain maintenance routines for the equipment in the local office.

Full details of a system of the type indicated in FIG. 1 are shown in the copending application of A. H. Doblmaier et al. Ser. No. 334,875, filed Dec. 31, 1963. Briefly, however, in the system of FIG. 1 a main control 16 supervises the operations of the central processor 13 in which it is included. The main control 16 is a data processing unit that is responsive to instructions arranged in a predetermined program sequence and stored in a memory 17. In order to communicate with the rest of office 11, main control 16 is responsive to those instructions for receiving changes in local office input signals from scanners 18 and utilizing data, which is also stored in memory 17, to produce appropriate operation of signal distributors 19 and central processor peripheral units 20. The peripheral units 20 advantageously include teletypewriter apparatus to permit communication between the central processor and attending personnel, automatic message accounting apparatus, and other well known units for providing auxiliary processor functions. Certain portions of processor 13 are duplicated, and the duplicate processor portions 14 operate in parallel with processor 13. The duplicate portions include, for example, control for scanners 18 and distributors 19, main control 16, memory 17, and controls for the peripheral units 20. The steps in the operation of the two main controls are compared in a direct-current-coupled matching circuit 15. If a mismatch should occur in their functions or results it is detected by the matching circuit 15. Such a mismatch causes interruption of the main program while a special program determines the cause and disables any faulty apparatus. The present invention is primarily concerned with certain aspects of the main control 16 as will be hereinafter described.

*Main control*

In FIG. 2 is illustrated the main control 16. Scanners 18, distributors 19, and peripheral units 20 are also shown in FIG. 2 to provide reference for orienting the circuit of FIG. 2 with respect to FIG. 1. Plural temporary storage registers or index registers 21 through 24 are arranged with their inputs coupled to a masked bus 26 through a delay register 34 and their outputs coupled to an unmasked bus 27. Each of the index registers 21 through 24 is advantageously employed as an accumulator when selected for that purpose by instruction coding. The delay register 34 is utilized as a buffer to prevent the establishment of a feedback path from output to input of an index register when its contents are being modified and replaced in such register. A memory access register 28 is arranged to provide input and output for processing words. Register 28 supplies signals to the unmasked bus 27 and receives signals from the masked bus 26. A register 25 is the program address register, and the registers 21 through 24 are further designated the X, F, Y, and Z registers, respectively. Additional, or fewer, similarly connected registers may be provided; but the five shown are adequate to demonstrate the principles of the present invention and many of the features thereof.

Figure 3:
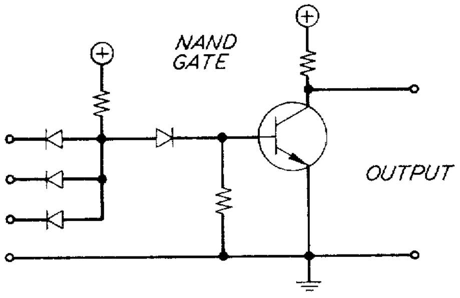
FIGS. 3 and 4 are diagrams of logic circuit blocks utilized in circuits of the invention.
Figure 4:
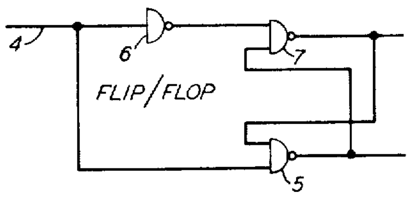

Each of the registers in FIG. 2 includes AND-NOT, or NAND, logic gates of the type shown in FIG. 3 arranged in flip-flop circuits as shown in FIG. 4. As shown in FIG. 3, each gate includes diode-resistor AND logic in the input thereof. Such logic is coupled to a transistor amplifier inverting stage to provide the NAND type of coincidence gating when used with plural input connections or simple inversion when used with a single input connection. The gate is enabled by the coincidence of high voltage signals at the input connections to cause the transistor to conduct and produce a low voltage output signal. The gate is disabled by a low voltage at any of the AND input terminals thereby preventing transistor conduction and producing a high voltage output signal. The usual schematic representation of such a gate is shown in FIG. 4 where three of the gates are employed in a bistable circuit of the type used in registers of FIG. 2.

In each register, one bistable circuit is provided for each input lead, and it receives single-rail logic input and produces two-rail logic output. Thus, an input signal on a lead 4 is coupled directly to a gate 5; and its complement, produced by the inversion in a gate 6, is applied to a gate 7. The outputs of the gates 5 and 7 are cross-coupled in the usual manner to produce bistable operation. Accordingly, any change from ONE to ZERO, or vice versa, on lead 4 produces in the states of gates 5 and 7 the same effects as a double-rail input. A binary ONE is represented by a signal on one output lead and no signal on the other, and the reverse represents a binary ZERO condition. The double-rail arrangement facilitates overwriting the contents of a register without utilizing a reset pulse in some situations. The same logic is also used for coupling from memory 17 to access register 28, but a reset signal is nevertheless employed for that register in certain situations to be described. Single-rail logic is used to extract the outputs of all registers in FIG. 2 by utilizing only one output of each register bistable circuit.

Most of the line circuit representations illustrated in FIG. 2 are multiconductor bus circuits since the main control 16 is adapted to process information words on a bit-parallel basis. Illustrative numbers of conductors are indicated in parentheses adjacent different circuits in FIG. 2. Bus circuits of particular interest in FIG. 2 are indicated by broad lines, and other multiconductor circuits, or cables, are indicated by lines of lesser width. In all cases bit-by-bit electric circuit connection to a bus is indicated by a line originating at the bus or terminating at the bus, and similar electric circuit connection among the multiconductor cables is indicated by a circular dot at the intersection of such cables. When only a portion of the conductors of a cable are separated from the rest of the cable the arrangement is indicated by a curved line branching from the cable.

Since the main control 16 operates in synchronization with a predetermined clock time base, various coincidence gates are provided throughout the circuit of FIG. 2 for exercising the time base control at the appropriate points in accordance with the operating modes which will be hereinafter described. These gates are NAND gates of the type already described in connection with FIGS. 3 and 4. The time base control input lead to each such gate is simply a short line protruding from the gate. The latter line indicates a connection to a gate control circuit 30 which causes the operation of the various gates at the proper times in accordance with the cooperative control of the time base clock is sequence control 33 and the processor program.

Sequence control input leads from circuit 30 to single-rail gates such as gate 29 are designated by a three or four letter mnemonic reference character to facilitate association with the timing diagram of FIG. 10. Thus, for example, a gate with an XRUB sequence control input lead is enabled to couple signals from the X register 21 to the unmasked bus 27. Sequence control gates are utilized as illustrated in FIG. 2, but specific actions of such gates will usually not be discussed except in relation to discussion of FIG. 10.

Program instructions and data are nondestructively read out of memory 17 as required and applied to the memory access register 28. A typical illustrative read-out includes a forty-bit memory word which would be all data for a data read-out and which for instruction read-out would include twenty bits of instruction code in the left half of register 28 and twenty bits of address information in the right half of register 28. Other bits in addition to the forty here mentioned may, of course, also be included for such auxiliary functions as error detecting and correcting, but a discussion of these is not necessary to the present invention. The left-most twenty bits of the instruction word are applied from memory access register 28 to an instruction register 31. A decoder 32 receives the instruction signals from the register 31 in binary coded form. In certain situations to be described decoder 32 also receives the right-most twenty bits directly from register 28. The decorder 32 operates in synchronism with a sequence control circuit 33, which includes a clock signal source not shown, the convert the operation codes of the instruction into a plurality of discrete bias signals which represent the corresponding machine language for controlling the various circuits of the main control 16 in the manner to be described. These bias control signals are transmitted by the conductors of a decoder output cable 36 as a result of the cooperative functioning of gate control 30 and the decorder 32 in a manner well known in the art.

Twenty-bit processor words are extracted separately from either half of the memory acess register 28 for application to the unmasked bus 27. That is, data is taken from either half of register 28 and addresses from only the right-hand half. In like manner twenty-bit processor words may be applied to either half of the register 28 from the masked bus 26 via an insertion mask circuit 37 to complete a forty-bit memory word to be written into memory 17.

*Tandem operation circuit 38*

In accordance with the present invention, a signal operation circuit, or bus, 38 is connected to couple signals from the unmasked bus 27 to the masked bus 26. The circuit 38 includes a number of signal operation circuits for performing different functions on a signal flow-through, or combinational, basis which will be described. Such circuit are arranged in tandem and their individual operating modes or characteristics are established under the control of signals received from the decoder output cable 36.

The first function performed in the circuit 38 is either a shift or rotate wherein the individual bits of a bit-parallel information word, including either address or data, may have their bit positions altered to produce the effect of either a right adjustment or left adjustment thereof. If information is shifted across the bit transmission paths, the bit positions vacated by the trailing information bit are forced to zero; and the leading information bits, equal in number to the number of bit positions of shift, are lost as they move out of the end bit position. However, if information is rotated, the leading bits which would otherwise be lost are taken by end around carry into the vacated positions. Control of either shift or rotate and the direction and amount of shifting or rotating come from decoder 32 via cable 36. Control of the amount of shifting or rotating is alternatively supplied from an index register via the argument bus 42 and circuit 46. The shift or rotate circuit 39 is not a shifting register or a counting type of circuit which must be stepped through its function by timing pulses. It is, instead, a controlled combinational arrangement of crosscoupling gates which in effect shift each individual bit of an input information word to a different bit transmission path from that on which it was received. A shift or rotate circuit of this type is disclosed and claimed in the copending application Ser. No. 420,566, of D. Muir III, filed Dec 23, 1964. The details of the shift or rotate circuit 39 which are necessary to a discussion of the present invention will considered in connection with FIG. 5A.

The next tandem function to be performed in the operation circuit 38 is masking, and for this purpose the wired mask 40 is provided. The wired mask represents a separate function, but circuitwise it can be integrated into the shift or rotate circuit as will be discussed. Briefly, a number of wired masks are available for permitting the passage of information bit groups of various sizes. In the illustrative embodiment herein, right-adjusted masks are advantageously employed. The particular mask to be used is enabled by signals from the decoder 32 which represent decoded instruction word bits.

A logic circuit 41 is included as the third tandem operating circuit in the operation circuit 38. The logical functions which are advantageously performed in the circuit 41 include subtract, AND, OR, and EXCLUSIVE OR. Only one of these is performed at a time, and the particular one to be used is selected by control signals from the decoder 32.

It can be seen from FIG. 2 that information signals passing between an index register and the memory access register 28, or passing to or from the registers 21 through 25, must pass through the signal operation circuit 38. During such a transmission program-controlled shifting or rotating, wired masking, and logic operations are performed. The cicuits 39, 40, and 41 can be utilized individually or in different combinations. Each such circuit is arranged, as will be described, so that, if its particular function is not to be employed on a certain signal pass, the signal nevertheless passes therethrough without modification. It is not necessary to remove the unused circuit from the circuit 38. Thus, a twenty-bit processor word from the register 28 passes through the unmasked bus 27, the full extent of the operation circuit 38, masked bus 26, and delay register 34 to one of the registers 21 through 25. From such a register the information word can thereafter be passed through the unmasked bus 27, the operation circuit 38, masked bus 26, and insertion mask 37 back to the register 28. Alternatively, of course, a word can be looped from one of the internal registers 21 thorugh 25 through the operation circuit 38 and delay register 34 back to another one of the internal registers.

*Argument bus*

Logic operations of the type indicated for the logic circuit 41 must, of course, be performed with two different argument signals. One of these is provided by the input from wired mask 40 or, alternatively, by a separate input circuit 64 direct from the memory access register 28. Circuit 64 can be utilized if it is desired to utilize logic circuit 41 at the same time that a processor word is being coupled out from an index register through bus 27 to distributors 19. In accordance with the present invention the other argument signal is provided from one of the internal registers 21 through 24. The outputs of such registers are coupled to an argument bus 42 in addition to their aforementioned connections to the unmasked bus 27. From the argument bus 42 such signals are coupled through a one-bit rotate circuit 43 and a gating circuit 46 to the logic circuit 41. Alternatively, the signal in the output of the one-bit rotate circuit 43 is further coupled through a complement circuit 47 to the gating circuit 46. The circuit 46, details of which are shown in FIG. 5B, selects the output from either the one-bit rotate circuit 43 or the complement circuit 47 in accordance with control signals from the decoder 32. The rotate circuit 43 and the complement circuit 47 are used in cooperation with logic circuit 41 to perform addition and subtraction by ones complemnt arithmetic. Circuit 43 also facilitates limited incrementing of the contents of one of the registers 21 through 25.

*One-bit rotate circuit 43*

The one-bit rotate circuit 43 and the particular organization of memory 17 in the illustrated embodiment are interrelated. It is advantageous to employ 40-bit memory words for memory operations and 20-bit processor words for processor operations. In order that the decode may be able to designate which 20-bit half of a memory word is to be employed in the processor it is convenient to number all 20-bit half words in memory and recognize in the decoder that, for example, an odd numbered address is the left-half twenty bits of an indicated location. An even numbered address defines either the right-half twenty bits or the entire 40-bit word, and the decoder decides from the operation code of the working instruction which meaning is intended. The even numbered addresses of full memory words are accommodated for indexing purposes by the one-bit rotate circuit 43. Thus, when indexing is to be performed, the contents of the appropriate index register are passed through circuit 43 with a one-bit left rotation and utilized in the logic circuits 41 in the usual manner. The one-bit of rotation is, for the binary coded index, the same as doubling. However, when the index is to be incremented it is increased by one in a fashion which will be described. Accordingly, the read-out of the index register is doubled for each indexing operation without changing the contents of the register, and during incrementing such contents are increased by one. In instructions where the index is itself the address that is to be used, as in transfer instructions, the programmer can indicate in the mnemonic operation code that the one-bit rotation is to be inhibited as will subsequently be described.

Circuit 43 is shown in detail in FIG. 12 and includes gates 131 and 132 in an arrangement for providing a one-bit left shift in a fashion similar to the FIG. 5A circuits to be described for a similar function. However, in FIG. 12 a lead 133 couples the AB19 input to the gate 132 in the zero bit position to provide end around carry for effecting a rotation. A gate 136 receives from decoder 32 a low voltage to disable the gate when a rotation is desired. The output of gate 136 enables a gate 137 to produce a low voltage output that disables the gates 131. The output of gate 136 also enables the one-bit rotation gates 132. A complement-of-two signal from decoder 32 is a low voltage applied to disable a gate 138 at the same time that gate 136 is disabled for a rotation. A gate 139 inverts the output of gate 138 to produce a low voltage signal that disables all of the gates 131 and 132. A gate 140 is fully enabled by the outputs of gates 136 and 138 at the same time to clamp the one-bit-position output lead to a low voltage while other output leads are in a high voltage state because gates 131 and 132 are disabled. These output voltage conditions constitute the complement of two for a twenty-bit word.

If the decoder complement signal is applied in the absence of a rotation signal a wired complement of unity is specified. Gate 140 is disabled by the output of gate 136 and a gate 141 is enabled by the high outputs of gates 137 and 138. Gates 131 and 132 are disabled as before, and the output of gate 141 clamps the output lead of the zero-bit-position to a low voltage to represent the complement of unity.

If neither rotation nor complement is called for, the high voltage decoder signals enable gates 136 and 138 to disable gates 132, 137, 139, 140, and 141. Gates 131 are enabled by the output of gate 137 so that they are responsive to input information on leads AB0 through AB19. The output provided to the gate 46 and complement circuit 47 is the complement of such input information as a result of the inversion in the gates 131. Thus, a complemented signal is taken directly from the output of circuit 43; but an uncomplemented signal is taken from the output of complement circuit 47 as a twice-inverted signal.

The use of the aforementioned wired complement arrangements in the rotate circuit 43 and of the complementing circuit 47 indicates that the processor of the invention performs ones-complement arithmetic in logic circuit 41. This mode of operation together with the features of the binary number system are utilized to advantage in accordance with the present invention. Thus, in most processors it is necessary to provide a bit position in the processor word that is dedicated to the specification of the sign of data in the processor. Processor circuits wired to that bit position are utilized for appropriate sign-dependent arithmetic controls. Consequently, that bit position normally is not used in the processor when addresses are being considered; and, therefore, the capacity of memory which can be specified by the available bits is halved in such prior art processors.

In binary notation the maximum number N that can be specified in $n$ bits is exactly twice the number that can be expressed in $n-1$ bits. Furthermore, corresponding numbers in the first and last halves of the first N positive numbers differ with regard to the presence or absence of a ONE in the most significant bit position and with regard to the fact that they are complements of one another. For example, the numbers unity and six in binary notation are 001 and 110 which are complements. In the present invention only $n-1$ bits are employed for unsigned data expression becaue the $n$th bit position is in effect employed as a sign bit for data. The full $n$ bits are employed to express instruction and data addresses.

All binary-coded signals are operated upon by the same circuits, regardless of whether they are addresses or data. The use of such signals determines the way in which the bits are interpreted without dedicating a bit position to a certain function. Thus, the binary signals representing 110 would be interpreted as the address six in the memory access circuits and as minus one in an index register. One practical example of an operation would include indexing the address six (110) by adding minus one (110) stored in an index register. To accomplish this the minus one is complemented (001) and then subtracted from six in logic circuit 41. The result of 110 minus 001 in binary equals 101, or five in decimal; and that is the indexed address. An example in data terms would be to add minus one (110) and minus one. This involves an addition of the same binary expressions previously described, in the same procedure, to get the same binary answer, namely 101. However, in data terms this answer is minus two.

The common transmission circuit 38 provides the signal modification circuits for all accumulating registers 21 through 25 for both address and data manipulation. The use of one's complement arithmetic makes it possible to utilize the full bit capacity of circuit 38 for useful expression of both data and address information without exclusive dedication to either.

In considering the tandem operations of the circuit 38 subsequently it is convenient to note the normal voltage level conditions on the circuit buses associated therewith. On all three of the buses 26, 27, and 42 a high voltage condition represents a binary ZERO and a low voltage condition, e.g., ground, represents a binary ONE.

The argument bus 42, in addition to supplying argument signals for the logic circuit 41, also supplies such signals as are required to the shift or rotate circuit 39 to indicate the amount of shift or rotate which is required. The decoder 32 also controls the selection of the source of such amount signals either from decoder 32 as previously described or from an index register. Since the operation circuit 38 functions on a signal flow-through basis, it is apparent that the single argument bus 42 cannot simultaneously supply a shift or rotate argument to the circuit 39 and a logic operation argument to the one-bit rotate circuit 43. Accordingly, during any signal flow-through operation in which both logic circuit 41 and the shift or rotate circuit 39 are to be used, the logic circuit 41 gets its argument from argument bus 42, and circuit 39 gets its amount information from decoder 32. For applications in which it is necessary or desirable to employ additional signal modifications on a single signal pass through a single operations circuit 38, the outputs of the registers 21 through 24 can be gated to additional argument buses, not shown, as indicated by the diagonal lines 48 connected to the outputs of those index registers. Such additional connections and their associated circuit 38 operations necessarily require, however, that the instruction word, and the register 31 and decoder 32 which handle the operation code portion of such word, must have adequate capacity for the control bits to specify the additional operations.

*Insertion masking*

The insertion mask 37 is employed with the shift or rotate circuit 39 when it is desired to pack a less-than-word sized group of information bits into a memory word.

The insertion mask 37 is utilized to insert a selected bit group into a predetermined place in a twenty-bit portion of the word in the memory access register 28 without overwriting the full twenty-bit extent of that word portion.

The insertion mask applied by mask circuit 37 is advantageously selected by the decoder and is either a wired mask or a logical, i.e., internally stored, mask. The wired mask is derived by a mask deriving, or translator, circuit 49 which receives coded mask-defining arguments from decoder 32. These are the same type of arguments, i.e., mask shift and size, that are employed by the shift or rotate circuit 39 and the wired mask circuit 40. The mask size and amount of shift are utilized to derive a set of gate enabling signals, as will be described in connection with FIG. 9, to cause the insertion mask 37 to pass only the selected bit group from the masked bus 26 to the memory access register 28. Thus, wired mask enabling signals from the mask deriving circuit 49 are applied to a selection gate 50 which also receives logical mask input signals from the one-bit rotate circuit 43 and the complement circuit 47. Gate 50 is substantially the same type as gate 46.

The logical mask signals represent a previously generated mask configuration which had been placed in one of the index registers and thereafter made available to the mask selector gate 50. The selector gate 50 responds to decoder output signals for selecting either a wire mask or a logical mask and, if a logical mask is chosen, for further selecting either the mask directly received from the index register or the complement thereof. The selected mask is then applied to the mask circuit 37 for controlling the flow of signals from the masked bus 26 to the memory access register 28.

*Program transfer*

Program transfer from each instruction to the next succeeding instruction in the main control 16 of FIG. 2 will now be outlined. The program instructions are stored in sequentially addressable locations in memory 17 in the usual manner for stored program data processing machines. The first of these addresses is placed in a program address register 25 of main control 16 in the usual manner for programmed machines. When machine operation is initiated, the contents of program register 25 are sent by a circuit 44 as an address to memory 17. Later the sequence control circuit 33 causes the register 25 to read out to the unmasked bus 27, and this signal is passed through the operation circuit 38 wherein it is incremented in the logic circuit 41 by a wired-in complement of two argument from the one-bit rotate circuit 43.

The incremented program address in the output of the operation circuit 38 is passed from the masked bus 26 to the delay register 34 for temporary storage. Subsequently the contents of the delay register 34 are transferred back to the program address register 25. The register 25 holds the address until sequence control 33 calls for the next instruction. At that time the program address register is read out to the access circuits of memory 17 via the circuit 44.

A decision logic circuit 45 is provided for accomplishing tests of the type well known in the art for determining whether or not a transfer is to be made toa predetermined part of the stored program. Typical tests would, for example, determine whether or not a quantity is zero or what its relationship to zero might be. Details of decision logic 45 are not shown because they are not necessary to an understanding of the present invention.

Briefly, logic circuit 45 may include decoder-controlled snapshot gating for indicating the condition of the contents of delay register 34 when data is being processed. Such gating activates logic for triggering a flip-flop circuit 54 in response to an all-ZERO condition and to trigger a flip-flop circuit 55 to indicate the sign of data in register 34. The conditions of flip-flop circuits 54 and 55 are coupled to gate control 30 and utilized in cooperation with outputs of decoder 32. If a transfer is indicated, the address in the address field of the instruction is gated from memory access register 28, indexed as required, and coupled via masked bus 26 both to the memory access circuits and to delay register 34. In register 34, the previously tested data is overwritten; and subsequently the address from register 34 is placed into program address register 25.

Delay register 34 provides a convenient location for bringing into the main control 16 the outputs from scanners 18. In addition, register 34 has another useful function. When a transfer instruction is to be executed, the contents of program address register 25 are incremented, in the manner just described, at the end of the operation which resulted in the calling of the transfer instruction. he incremented address is held temporarily in register 34 before being placed in the program address register 25 in the event no transfer is required. However, if a transfer is required, the contents of register 34 are directed instead into one of the index registers 21 through 24 to be saved as a return address if needed. Thereafter, during the transfer instruction cycle the contents of the transfer instruction address field are moved into the program address register and to the memory access circuits. While awaiting response from the memory the new contents of register 25 are incremented as usual. The use of index registers in this manner to store return addresses can be advantageously repeated for transfer instructions of nested subroutines up to the limit of available registers.

At the end of a subroutine, the return address is called directly from its index register and sent directly to both the memory access circuits and to the program address register 25 via delay register 34. Thereafter operation proceeds as usual.

*Matching*

Delay register 34 is also advantageous employed in other ways to facilitate processor maintenance. It is, for example, well known to operate plural processors in parallel and to match their contents at predetermined circuit locations and cycle times in the manner shown in FIG. 1. If a mismatch is detected, a maintenance program is initiated to check for error or fault and, if an unreproducible error is indicated, to return to data processing at the point where the mismatch was detected. Retrace to a check point in the program is usually required in prior art machines because there is no way to determine which processor contains erroneous information. However, it has been found that with the circuit of the present invention, if fast direct-current-coupled matching circuits are employed, the matching results are available before delay register 34 content is stored in an index register thereby overwriting good information. Thus, when a mismatch is discovered and found, for example, to be due to an error, the processor of FIG. 2 repeats the instruction then in process and continues operation. Since every instruction can be checked by matching before overwriting, fewer checkpoints are required.

The main control of a data processing machine such as that described herein includes, of course, many auxiliary functions not described. These functions and operations are well known in the art and are not here presented because their discussion is not essential to an understanding of the arrangement and operation of the present invention.

*Shift or Rotate*

FIGS. 5A and 5B, when placed adjacent to one another with the orientation indicated in FIG. 5C, comprise a composite schematic diagram of the relevant portions of the operation circuit 38. The FIGS. 5A and 5B illustrate the manner in which the various previously mentioned signal modifications are accomplished to produce the desired functions on a signal flow-through basis. In FIG. 5A the leads 51, 52, and 53 represent three of the twenty bit transmission circuits which couple the unmasked bus 27 to the shift or rotate circuit 39. A few portions of the shift or rotate circuit are illustrated in FIG. 5A to demonstrate the type of operation employed and full details are presented in the aforementioned Muir application.

It is assumed that an index register, and not decoder 32, supplies information on the amount of shift or rotation required. A cable 56 couples five circuits from the argument bus 42 to a group of selector gates 58 to provide binary coded signals directing the extent of transverse shifting or rotating which is required. The selector gates 58 comprise simply a set of coincidence gates in each of the circuits of cable 56 and are controlled by the decoder output signals to direct an effective right or left shift operation. The outputs from the selector gates 58 are presented on five two-rail logic circuits to prevent in a binary coded form the amount of shifting or rotating which is required, as well as the complement of that binary coded information. Each set of outputs represents a different level of binary significance and is applied to a different set of gates. The selector gates 58 also include output connections which control either shift or rotate, and either left or right movement of information, as taught in the Muir application; but such connections are not presented herein because they are not essential to an understanding of the present invention.

Considering just the signal flow-through paths of the shift or rotate circuits in FIG. 5A, one-bit and two-bit shifts will be considered. Two sets of AND–NOT gates of the type illustrated in FIG. 3 are included at each level of binary significance for steering signals in the flow-through paths. For example, at the level of least binary significance, the gates 59 are enabled by the complement of the unity level output lead from the selector gates 58. High voltage signals on leads 51, 52, and 53 are passed through those gates and through the unity level of the circuit without shifting. However, if the unity output lead from selector gates 58 is at its high voltage level, the cross-coupling gates 60 are enabled; and the gates 59 are disabled. Accordingly, signals on input lead 51 bypass a gate 59 and are coupled through a gate 60 to the signal flow path 52′ which is also connected to the output of the disabled gate 59 in the input bit path 52. This represents a one-bit right shift, and a similar shift is accomplished in the same manner in all of the twenty bit positions. If a rotate were being performed the signal flow path 51′ would receive the output of a gate 60 at the twentieth bit position, not shown. However, for the pure shift considered the output of the bit circuit 51 is forced to be a binary ZERO at lead 71 because at least one of the intervening gates is disabled, by leads not shown in FIG. 5A.

At the next level of binary significance the gates 61 are enabled by the complement of the "two" output of gates 58 to allow direct flow-through of the signal, and a gate 62 for controlling transverse information coupling is simultaneously disabled by the "two" output. When a two-bit transverse movement is required, all of the gates 62 are enabled by the signal on the "two" lead in the output of the selector gates 58, and the illustrated gate 62 couples the bit information from the signal path 51′ to the signal path 53″ to accomplish the two-bit movement. Similar gating arrangements are provided at the binary "four," "eight," and "sixteen" levels; but only the gates at the bottom level are shown. It is apparent, of course, that shifts can be accomplished on a single signal pass at more than one of those levels by enabling the cross-coupling gates at the appropriate levels to achieve the desired total shift.

*Wired mask*

The wired masking operation is advantageously accomplished by providing on the gates 63 and 68 at the binary "sixteen" level individual input control connections from a binary-to-mask translator 66 via the conductors of a cable 67 and a branch cable 67′. Translator 66 has a separate output for each bit position in a processor word, and each such output goes to a different conductor in cable 67 and the corresponding conductor in branch cable 67′. Translator 66, which is a part of the wired mask 40 in FIG. 2, receives four bits of binary coded information from the decoder 32. Those bits represent the bit size of a right adjusted mask, and they permit the specification of sixteen different masks. However, more masks can, of course, be specified if additional bit space is provided in the instruction format. Within translator 66 each binary-coded mask name is converted, by well known circuit techniques, to a decimal type of indication whereby a different predetermined number of the translator output leads are marked with gate-enabling signals and the remainder have gate-disabling signals. The leads with gate-enabling signals are coupled in cables 67 and 67′ to gates 63 and 68 in the appropriate bit positions to provide the mask window.

It can be seen from FIG. 5A that the shift or rotate and masking functions are accomplished by enabling certain coincidence gates in signal bit flow-through paths.

Each such path includes a direct current signal flow circuit from input to output with no intervening time gates portions. For example, if a one-bit shift were directed with no masking, an information bit on the input lead 51 to the shift or rotate circuit 39 would pass through the gate 60 from the path 51 to the path 52'; and from that point the bit would flow through the gates 61 and 63 to the output lead 72. If a mask were called for to block transmission in the flow-through path of the second bit position, illustrated a gate 63, which is coupled to lead 72, would be disabled by the signal from cable 67 and thereby prevent the appearance of the aforementioned signal from lead 51 at the lead 72. If no shifting, rotating, or masking were called for the signals would nevertheless flow through the circuits of FIG. 5A. Thus, the signal on lead 51 would flow through its gate 59, lead 51'; gates 61 and 63, and lead 71; and similar flow-through paths would be enabled in other bit positions.

*Logic circuit 41*

In FIG. 5B the output leads 71 and 72 from the wired mask 40, and the other eighteen bit path leads not shown from the wired mask 40, are coupled to the logic circuit 41. Within the latter circuits each bit transmission path is treated in substantially the same way by identical hardware so the circuitry for only one bit transmission path of the twenty is indicated. At the input to the logic circuit 41 decoder controlled selection gates 73 select the output from either wired mask 40 or the memory access register 28 and produce a double-rail logic output for the bit path. Thus, a gate 76 transmits a one-bit output from the wired mask 40, and a gate 77 transmits the corresponding bit output from the register 28. One or the other of these gates is enabled by a decoder output signal from the leads 78 and 79. Although leads 78 and 79 are also designated with the time gating reference characters MRLC and WMLC, respectively, for convenience of description in connection with FIG. 7, they are actually decoder controlled. The normal decoder output on lead 74 is inverted by a gate 75 to maintain gate 76 enabled for coupling through signals from wired mask 40. This same signal on lead 74 disables gate 77 for signals from memory access register 28. For certain operations the signal on lead 74 is changed to disable gate 76 and enable gate 77.

The outputs of the gates 76 and 77 are combined and applied through another gate 80 to accomplish an inversion and to provide an output signal X1 on the lead 82. The combined outputs of the gates 76 and 77 are also applide directly to an output lead 81 for providing an $\overline{\text{X1}}$ signal. The use of the horizontal bar over a reference character, e.g., "$\overline{\text{X1}}$," is another, and sometimes more convenient, way of indicating the complement. Thus, the leads 82 and 81 contain the information signal representing one bit of a word and the complement of that one bit, respectively.

Argument signals for the logic circuits 41 are provided from the decoder controlled selector gates 46 which select the argument input from either the one-bit rotate circuit 43 or the complement circuit 47 as dictated by the program instruction being executed. Gates 83 and 86 receive an input from the complement circuit 47 and the one-bit rotate circuit 43, respectively. Gate 86 also receives a decoder input signal, and the gate 83 receives the complement of the same decoder signal from a gate 87. Thus, one or the other of the gates 83 and 86 is always enabled while the other is disabled. An additional gate 88 couples a further decoder input signal into the selector gate 46 for providing a clamp on the common output of the gates 83 and 86 when it is desired to transmit an information bit through the logic circuit 41 with no logic operations performed thereon.

A high voltage input signal from the decoder to the gate 88 causes its output connection, which is common to the outputs of gates 83 and 86, to be clamped to ground and thereby disable the logic circuit 41 for logical operations. The aforementioned common output connection is connected to a lead 89 to provide a Y1 output, and it is also coupled through a gate 90 to provide on a lead 91 a $\overline{\text{Y1}}$ output which is the complement of the Y1 output. Thus, for the one bit position illustrated in FIG. 5B, one logical argument is provided on leads 81 and 82 in double-rail logic form, and the other argument is provided on the leads 89 and 91 in similar form.

*Logic selection*

Four logic operations are advantageously performed by the illustrated circuit 41. These are subtraction, AND, OR, and EXCLUSIVE OR as was hereinbefore outlined in connection with FIG. 2. The subtraction is an addition if the argument from selector gate 46 is in its complemented form. These operations are accomplished by the multiple-input AND–NOT, or NAND, gates 92, 93, 96, and 97, all of which have their single output connections coupled to a common junction 98. Each of these gates has an input connection from two of the four argument leads as well as an input connection from the decoder and a fourth connection from a borrow-developing circuit 99.

The borrow circuit 99 receives an input connection from each of the four argument leads for the single bit position illustrated, and it also receives corresponding inputs from other less significant bit positions as schematically indicated by the lead 94. Circuit 99 develops binary ONE and ZERO borrow signals, in a manner which is known in the art for full subtractor circuits, for each bit position, but outputs for only one position are here shown. The binary ONE output is applied to the gates 92 and 93, and the binary ZERO is applied to the gates 96 and 97 for the illustrated one-bit circuit. Input connections from decoder 32 on leads LB1 and LA1 are coupled to a gate 100 to apply an inhibit signal to the borrow circuit 99 when either decoder signal is low, thereby indicating that some logical operation other than a subtraction is to be performed. The effect of the inhibit is to bias both the ONE and the ZERO outputs in the circuit 99 to the high condition. The status of the decoder signals on the leads LB1 and LA1 for the various logical operations is indicated in the truth table of FIG. 6 wherein a ONE indicates a high voltage condition on a lead and a ZERO indicates a low voltage condition. If no logic is to be performed, i.e., the equivalent of subtracting zero, the decoder calls for a subtraction and activates gate 88 as previously described to block argument signals from circuits 43 and 47.

A translator circuit 101 is coupled to receive signals from the leads LB1 and LA1 to produce three control signals for the gates 92, 93, 96, and 97 of each bit position with appropriate fan-out amplification, not shown, as may be required to accommodate corresponding gates in all other bit positions not shown. This translator is illustrated in FIG. 7 and includes two gates 102 and 103 for inverting the two input signals as well as four additional translating gates 104, 106, 107, and 108. The gate 106 receives its inputs from the leads LA1 and LB1 to disable a gate 104 and produce a SUB output which enables gate 93 for a subtraction and disables it at all other times. The gate 107 receives one output directly from the lead LA1 and another output from the gate 103 to produce an $\overline{\text{XOR}}$ output for disabling gate 92 for EXCLUSIVE OR operations and enabling it at all other times. Gate 108 receives inputs from the gate 102 and the lead LB1 to produce the $\overline{\text{AND}}$ output that disables gates 96 and 97 for AND operations and enables those two gates for all other functions.

The relationships among the logical functions, input signals applying different arguments, and the outputs at terminal 98 will not be reviewed. For all cases except subtraction the ONE and ZERO output leads of borrow circuit 99 are in the high voltage gate-enabling condition as previously described. Also, the output leads of translator 101 are in the conditions just described, as indicated by their labels, so that enabled gates are responsive to signal conditions on their two argument leads.

Thus, gate 92 is enabled for AND function, while the other gates 93, 96, and 97 are disabled because the $\overline{\text{XOR}}$ lead is high and the $\overline{\text{AND}}$ and SUB leads are low. The gate 92 receives the Y1 input and the X1 input, and it produces a low output signal at the junction 98 when Y1 and X1 are both high.

The EXCLUSIVE OR function is performed by the gates 96 and 97 because for that function translator 101 makes $\overline{\text{AND}}$ high and the SUB and $\overline{\text{XOR}}$ leads low. Gate 96 receives the X1 and $\overline{\text{Y1}}$ signals and produces a low output when both of those signals are high. The gate 97 receives the $\overline{\text{X1}}$ and Y1 signals to produce a low output when both are high. Consequently, both of the gates 96 and 97 are disabled and provide high output signals whenever both argument signals are in the same signal level condition. However, if the argument signals are at different signal level conditions, only one or the other of gates 96 and 97 is enabled and produces a low output signal.

The OR function is performed by the gates 92, 96 and 97 which are enabled by the high $\overline{\text{XOR}}$ and $\overline{\text{AND}}$ lead signals. Gate 93 is disabled by the low SUB lead signal for this function. The three enabled gates clamp the junction 98 at a low signal level if X1 and Y1 are both high, or when either Y1 or X1 is high while the other is low.

When a subtraction is to be performed all four of the gates 92, 93, 96, and 97 are enabled because the three output signals from the translator 101 are all in the high voltage condition. Those gates function cooperatively as a binary full subtractor in cooperative response to the argument signals from leads 81, 82, 89, and 91 and to the borrow signals from circuit 99 in a manner well known in the art.

Regardless of the particular form of logic that is selected by the decoder 32 via translator 101, the previously discussed direct current signal flow path, including lead 72 for example, includes the gate 76 in selector gates 73 and one of the gates 92, 93, 96, or 97. Thus, once the operation code appearing in instruction register 31 of FIG. 2 is decoded by the decoder 32, the corresponding output signals appear substantially simultaneously on the various circuits of the cable 36 and are applied to the decoder input connections in FIGS. 5A and 5B to enable the aforementioned direct-current flow-through signal path from the unmasked bus 27 to the masked bus 26. Upon application of a twenty-bit information word from the unmasked bus 27 to the shift or rotate circuit 39, the individual bit signals flow through their respective enabled paths, including crosscoupling for shifting or rotation, the limitations of masking, and the modifications of the logic circuit 41. No timing delays for interim registration are required to separate the different functions. The only time delay involved is that required for the signal to flow through its established path which includes wires and direct-current coupled diode-resistor gates with their included direct-current coupled transistor amplifiers.

FIG. 8 shows the details of the insertion mask 37 in a single-bit convention such as was employed in FIG. 5B. Appropriate masking signals for either a wired or a logical mask are applied from the selector gate 50, which is of the same type as the selector gate 46 in FIG. 5B. However, gate 50 includes additional gate structure so that decoder signals can select either a wired or a logical mask, and if logical is chosen the decoder signals further select either the mask or its complement, all as previously described. The mask output from gate 50 either enables or disables the four gates of each bit position in accordance with the mask definition which has been established. These four gates for the bit position illustrated in FIG. 8 are the gates 109, 110, 111, and 112.

Further control signals from the decoder 32 on the leads 113 and 114 provide control to cause the insertion mask circuit 37 to read out to either the left half or the right half of the memory access register 28. Thus, a high signal on lead 113 is accompanied by a low signal on lead 114, thereby enabling gates 109 and 110 while disabling gates 111 and 112. This bias arrangement causes read-out to the left half of the register 28. In a similar manner the high voltage signal on lead 114 causes the insertion mask to read out to the right half of the register 28. The twenty-bit input signal from the masked bus 26 is applied on the lead 116 to actuate gates 109 and 111 if either of them is otherwise fully enabled by the decoder signals and the mask signals. The output of gate 109 is coupled to an input of the gate 110 to provide the bit read-out for the left half of the register 28 as indicated by the reference character BL. The output of gate 109 represents a $\overline{\text{BL}}$ output, and these two outputs to the register 28 provide double-rail logic for controlling the individual flip-flop circuits of the register. Gates 111 and 112 are similarly interconnected to provide the outputs BR and $\overline{\text{BR}}$ for the right half of the register. Gates 109, 110, 111, and 112 include the time gating function schematically indicated in FIG. 2 by the timing gates with inputs designated MML and MMR.

*Wired insertion mask derivation*

FIG. 9 includes a simplified diagram of the mask deriving circuit 49. This circuit is claimed in the application of B. T. Fought, W. B. Macurdy, and D. Muir III, Ser. No. 422,247, filed Dec. 30, 1964, and entitled "Mask Generating Circuit." The circuit receives four decoder leads defining the size of the mask for insertion mask 37 with signals in the binary coded form. These four leads are designated P1, P2, P4, and P8 to indicate their binary significance. The circuit 49 also receives from decoder 32 five leads which define in binary coded form the amount of shift which defines the mask position with respect to the right-adjusted reference position. Each of the latter leads is connected to a separate inverting gate 118. Thus, signals are developed on ten input leads from the decoder cable 36 to represent the amount of shift in binary coded form and the complement thereof. These ten leads are designated A1, $\overline{\text{A1}}$, A2, $\overline{\text{A2}}$ . . . $\overline{\text{A16}}$.

All ten of the A-leads and the four P-leads are coupled to the input connections of a full binary adder 119. This adder provides on its five output leads S1, S2, S4, S8, and S16 the binary coded sum of the amount of shift plus the size of the mask window. This sum identifies the bit position of the end of the mask window for the insertion mask, while the binary coded shift information defines the bit position of the beginning of the wired mask window for the insertion mask.

The ten A-leads are applied to the inputs of a binary-to-one-out-of-20 translator 120 which has twenty output leads B0 through B19. In a similar manner binary-to-one-out-of-19 translator 121 utilizes the aforementioned binary sum from the adder 119 to produce signals on nineteen output leads E0 through E18 to define the end of the mask window. Only nineteen output leads are required on translator 121 since there is in this particular embodiment no need to provide a special signal for identifying a mask window which ends at the twentieth position.

A translating gate matrix 122 receives the signals from the twenty B-leads and the nineteen E-leads and translates those signals to provide bias voltages on twenty output leads G0 through G19, such that all leads within the mask window are biased to the low voltage condition while the remaining G leads are biased to the high voltage condition. Only six gates 123 and 126 through 130 of the gates in the matrix 122 are illustrated since the connections to the remaining gates and the remaining G leads are accomplished in the same manner. Full details of the operations of the mask deriving translator 49 and its matrix 122 are included in the aforementioned Fought et al. application.

*Instruction format*

Before considering timing and programming details of the illustrated circuits and the manner in which the features of the present invention are utilized to advantage in illustrative programs, the instruction word format which is employed will be considered. The instruction word includes four fields which are generally used for the mnemonic operation code, memory adderss, index register name, and function options, respectively. The use of the first three fields will be apparent to those skilled in the art. The function field is employed to identify the particular functions, and the range or mode thereof, to be performed in the tandem operation circuit 38 in the case of modification of information passing between an index register and the memory 17, or just between index registers. In the latter case the address field may also be employed to indicate additional function options, of the same type normally specified in the function field.

In a processor of the type represented by the control 16 of FIG. 2, many variations of operation and programming are possible. No attempt will be made to present an exhaustive list of the full range of program vocabulary or function permutations that might be available with the illustrated configutation or with obvious wiring modifications thereof. However, some illustrative instructions are presented to show the flexibilities that are available and to show how they can be utilized in some brief programs.

One illustrative instruction stated in general terms is

MR $\alpha,\beta,\gamma$

This instruction moves data from memory (M) to an index register (R). $\alpha$ is the address in memory from which the data is to be taken, and $\beta$ is the name of an index register that supplies an index for referencing the data address $\alpha$. $\beta$ may also include an instruction coding to increment the index automatically. $\gamma$ defines operations to be performed in circuit 38 and on arguments supplied from argument bus 42 to the logic circuit 41. A specific example of the MR instructions is

MX LIST,Y,PFC

X is the register that is to receive the data. LIST is a reference location of a table in memory from which data will be withdrawn. The specific location in the table is obtained by indexing the address LIST with the contents of the Y index register 23. During transmission of the data from the memory access register 28 to the X register 21, the data is passed through the tandem operation circuit 38 in which the logic circuit 41 performs operations indicated by PFC in the instruction function field. In this case a logical product (P), or AND, operation is performed utilizing the complemented (C) contents of the F index register 22 as the argument for the operation.

*Instruction execution timing*

Specific examples of timing and programming of the circuit of FIG. 2 will now be considered to demonstrate some features of the circuit. In one advantageous arrangement the control circuits of FIG. 2 are operated in a three-phase cycle. Each instruction is carried out during one or more cycles of operation, and the decoder 32 responds to operation code signals from register 31 for operating the sequence control 33 through the correct number of cycles for the particular instruction. The reference to an *n*-phase cycle simply means that during each cycle of operation sufficient time is allowed to transmit *n* different batches of multibit signals through at least a portion of the operation circuit 38 and over the buses 26, 27, and 42.

By way of illustration, FIG. 10 includes timing cycle diagrams for typical one-cycle and two-cycle instructions. A fifty-six unit time scale is presented in the figure and extends over two cycles. The phases in each cycle are indicated with the first phase including ten time units and the second and third phases of the cycle including nine time units each. Horizontal lines below the time scale axis are provided with vertical tic marks to represent various time interval divisions. Reference characters associated with each of the indicated intervals refer to gate control signals which are supplied by the gate control 30, or by decoder 32, to the gate control input connection of the gate in FIG. 2 which bears the corresponding reference character on its control input lead.

In FIG. 10 the upper time diagram is for a register to register instruction RR which directs the main control 16 of FIG. 2 to take information from one of the index registers 21 through 24, couple it through the operation circuit 38 with the signal modifications directed by the decoder outputs, and return the modified information through the delay register 34 to one of the index registers. The general form of this instruction is $R_1R_2\ \gamma,,\delta$ $R_1$ and $R_2$ are the index registers between which information is to be moved. Any of the registers 21 through 24 may be used, and if the same register is utilized as both $R_1$ and $R_2$ it is operating as an accumulator register. Since no memory address is required the function definition $\gamma$ is included in the address field. No indexing is needed either so the index field is blank as indicated by the two commas. The $\delta$ in the regular function field specifies further functions to be performed.

A specific example of such an RR instruction is

XX M4QL8,,EZ

This loops the contents of the X register through circuit 38 with certain specified signal modifications. Register X is thus utilized as an accumulator register. A left rotation of eight bit positions in circuit 39 is indicated by QL8, and the use of a four-bit right-adjusted mask in circuit 40 is called for by M4. The EZ in the regular function field indicates that the contents of the Z register are to be utilized in logic circuit 41 as an argument for an EXCLUSIVE-OR operation with the output of mask circuit 40.

In the example in FIG. 10 the RR type of instruction is utilized to illustrate a one-cycle instruction execution. The XX example is utilized once more, but this time the argument for logic circuit 41 is obtained from the F register 22. The WMLC gate is continuously enabled in this instruction so it is not shown in FIG. 10 for the RR instruction. During the first phase of the cycle during which the instruction is carried out, the XRUB gate couples the output of the X register 21 to the unmasked bus 27 during the entire first phase. The gates LCMB and MBDR are also enabled during the same time interval to complete the flow-through signal path from the unmasked bus 27, through circuits 39 and 40 to the logic circuit 41 and from there through the masked bus 26 to the delay register 34. Thus, during the first phase a complete signal flow path is presented from the output of the X index register 21 to the input of the delay register 34.

During the same first phase the FRAB and the CCLC gates are also enabled to provide a through signal path from the output of the F register 22 through the argument bus, the rotate circuit 43, and complement circuit 47 to the logic circuits 41. The rotate circuit 43 and the complement circuit 47 are utilized in accordance with decoder output signals applied to the gate 46 and to the rotate circuit 43 as represented in FIG. 10 by the CCLC designations. Thus, an argument from the F register 22 is advantageously coupled, for example, through the rotate circuit 43 with an inversion but no rotation, complemented again in the circuit 47, and applied through the gate 46 to the logic circuit 41. In the latter circuit the F register contents may, for example, be subtracted from the contents of the X register. The resulting difference appears in the delay register 34.

Near the end of the first phase of the RR instruction the PRAD gate is enabled to couple the output of the program address register 25 to the access circuits of memory 17 to obtain the next succeeding instruction in the program for the central processor. During phase two of the cycle the DRXR gate is enabled to couple the output of the delay register 34 into the originating index register 21 while awaiting the return of the next instruction from memory 17.

In phase three of the cycle utilized for the RR instruction the new instruction requested in the first phase is received. The SMA gate is enabled for coupling signals from the read-out circuits of memory 17 to the memory access register 28. During the early portion of phase three, the REMA gate is briefly enabled to couple a resetting signal to the memory access register 28 to reset all of the flip-flop circuits thereof to the ZERO condition in anticipation of the incoming instructions from the memory as requested during phase one in response to the PRAD gate signal previously mentioned. Similarly the REIR gate enables the resetting of instruction register 31. Later in phase three the MLIR gate signal enables the input of instruction register 31 to receive the left-most twenty bits of the incoming instruction from the left half of the memory access register 28. Also the MRDC gate couples the contents of the right half of register 28 directly to the decoder 32 for utilization of the additional functions specified in the address field of this type instruction.

While the new instruction is being received as just described, the contents of the program address register 25 are being incremented. The incrementing operation is set up by the gate control signals PRUB and CCLC. These signals provide a through signal flow path from the output of the program address register 25 through unmasked bus 27 and the full length of the operation circuit 38. At the same time output signals from the decoder 32 control the one-bit rotate and wired complement circuit 43 to provide the complement of two in a twenty-bit word through the gate circuit 46 to the logic circuit 41.

The decoder 32 controls logic circuit 41 to perform the subtraction function to provide the necessary incrementing of the program address with the complement of two. Near the end of the third phase of the RR instruction the MBDR gate control signal couples the incremented program address into the delay register 34, and thereafter in the first phase of the next succeeding cycle the DRPR control signal transfers the contents of the delay register 34 to the program address register 25.

The complement-of-two signal is provided in circuit 43 for a particular reason related to the size of the memory access register. It is assumed first, for example, that nineteen binary coded bits can specify all of the memory full-word locations, and the nineteen most significant bit positions are used for them. Some of the memory locations contain forty bits of data, and others contain 40-bit instructions. In addressing a data location it is necessary to specify which half of the 40-bit word in the register 28 is to be read out to the 20-bit unmasked bus as a processor word. Accordingly, the least significant bit position in the data address of the instruction word is used for the latter purpose. However, for addressing instruction word locations, only the most significant nineteen bit positions are needed because the decoder and sequence control automatically permit only the right half of the register 28 to be coupled to logic circuit 41 via gate 73 on instruction words obtained from such an instruction address. Accordingly, register 25 is equipped to read out to bus 27 in only the nineteen most significant bit positions. In order to increment a nineteen bit address in the 20-bit logic circuit 41, it is necessary to increment at the next to the least significant one of the twenty bit positions; and the complement of two is utilized for this purpose.

I will be noted in FIG. 10 that in the register to register instruction RR the F register supplies the necessary argument for the logic circuits 41 as evidenced by the FRAB gating from that register to the argument bus. The desired logic and any complementing of the argument are specified in the left-most twenty bits along with the operation code. The amount of shift and the wired mask coding are specified within the right-most twenty bits where the memory address coding would appear for other instructions. Thus, the data from the X register flows from the operation circuit 38 in a continuous signal flow path, as indicated in FIGS. 5A and 5B; and three different operations can be performed on the information during its single transmission through the circuit 38. These three operations are the shift or rotate, a wired masking, and a decoder-selected logic operation with the F register argument. The decoder supplies control of direction and amount of shift as well as mask size as has been previously described.

A timing diagram for a memory to register instruction MR is presented in the lower portion of FIG. 10. This instruction is designed to shift a block of data from the memory 17 to one of the index registers 21 through 24 in two cycles. Since the Z register 24 will be utilized, the operation code would be MZ, but to facilitate association with FIG. 2 the more general MR form of designation is used herein for discussion.

In the first phase of the first cycle of the MR instruction, the MRLC gate couples the data address-in-memory portion of the instruction directly to the logic circuit 41. The path through the MRLC gate is provided primarily so that unmasked bus 27 will be simultaneously available for supplying the contents of an index register to distributors 19 on distribute commands at the same time that an address is being indexed. The shorter MRLC path is also used on MR commands as a matter of convenience. Alternatively, on the MR command gates MRUB and WMLC can be enabled to provide the usual signal path through bus 27 and circuits 39 and 40. These data address signals represent the address in memory 17 from which the data is to be moved into an index register. The address will usually require indexing; and in FIG. 10 it is assumed, for example, that the instruction specifies the X register as the index register for utilization to index the data address.

During the first phase of the first cycle, the gate control signals XRAB and CCLC enable the coupling of the contents of the X register through the argument bus and circuit 43 wherein the index is inverted to form the ones complement of the index. In the latter form the index is coupled by gate 46 to the logic circuit 41. The indexed data address is thus established on the masked bus 26. Near the end of the first phase the MBAD signal causes the indexed data address to be coupled from masked bus 26 to memory 17 access circuits to call for the data.

During phase two, while awaiting return of the data, the index in the X register is incremented, if called for in the instruction, to be ready for the next indexing operation. Incrementing is called for by adding A after the index register designation in the instruction. For incrementing the contents of the X registers the XRUB gate control signal causes output signals to be applied from the X register to the unmasked bus, and the WMLC and LCMB control signals set up the through signal flow path in the operation circuit 38 for such signals. At this time the decoder causes the rotate circuit 43 to apply the complement of one to the logic circuit 41. The sum formed by circuit 41 represents the desired incremented form of the indexing information. Near the end of the second phase the MBDR control signal enters the incremented information in the delay register 34; and thereafter, in the third phase, the DRXR signal establishes the incremented information in the X register.

In the third phase of the first cycle the REMA signal resets the memory access register 28, and the SMA signal enables the circuit from the memory 17 to the register 28 to receive the 40-bit data word from the memory as requisted during phase one. The full operating code of the MR instruction residing in register 31 is not disturbed by the resetting of the register 28 or by the entry of data therein because the MLIR control signal is not present, and the input to the instruction register 31 is disabled.

During the first phase of the second cycle of the MR instruction, the appropriate data must be moved from the register 28 to the indicated index register, in this case the Z register 24. For this purpose the MRUB gate couples the data in the right half of the register 28 to the unmasked bus, and the WMLC and LCMB control signals set up the through signal path in the operation circuit 38. If the data is to be modified, e.g., by the contents of the F register, the FRAB gate couples the contents of the F register 22 to the argument bus 42. The information from register 22 is utilized as directed by the decoder output signals for the MR instruction either to control the rotate circuit 39 or to provide the argument to the logic circuit 41. Near the end of the first phase of the second cycle the MBDR signal couples the data from the masked bus to the delay register 34, and at the same time the PRAD signal couples the output of program address register 25 to the access circuits of memory 17 for requesting the next instruction. While awaiting the new instruction, the DRZR signal appears during phase two of the second cycle for gating the content of delay register 34 into the Z register 24. During the third phase of the second cycle the new instruction is received in the memory access register 28 and in the instruction register 31; and the contents of the program address register are incremented, all in the same fashion that these operations were conducted in the third phase of the RR instruction.

The MR diagram of FIG. 10 illustrates the manner in which a single instruction with its particular operation code and operating options can specify a multicycle operation. During such an operation the tandem operation circuit 38 is advantageously utilized many times, and each time that it is utilized a different set of the available operations is advantageously performed. In the MR instruction of FIG. 10 the operating circuit 38 was utilized four times. It was first employed in the logic portion to index a data address. Thereafter in the same cycle it was utilized to increment the content of the index register employed in the first phase of the cycle. In the first phase of the second cycle operation circuit 38 was also employed to modify the data being transmitted from memory 17 to the index register, and in the third phase of that cycle the operation circuit 38 was again employed to increment the content of the program address register. As the data is moved in the second cycle a decoder-selected logic operation can be combined with a decoder-selected mask. Other combinations are also available as will be described. Accordingly, by utilizing the tandem operation circuit concept in a data processing machine, it is possible to program a system with a more powerful type of instruction than was herebefore available. It is not necessary to call, in separate machine phases, for each separate specialized function with interim storage or registration between such phases. The present invention enables the programmer to call for plural operations in a single phase of machine operation, and to utilize the same operation circuits in conjunction with all accumulator registers.

*Illustrative programs*

There are hereinafter presented some illustrative program lists which include instructions for certain telephone office operations. These instructions demonstrate some of the capabilities of the tandem operating circuits hereinbefore described for such functions as packing and unpacking less-than-word sized characters into and from full information words. The latter functions are particularly useful where central processors of the type described are to be employed to augment the capabilities of electromechanical offices which utilize different types of signaling codes. Thus, the one processor type can be applied to different office situations by simply modifying the program instruction options to suit the situation.

The first program to be considered is a program for unpacking successive digit groups, or characters, from the trunk register in a telephone office. Such digits are utilized to formulate a multifrequency outpulsing signal in a manner that is known in the art. The trunk register is, in this example, a register represented by an addressable storage location in the memory 17. The unpacking program selects and extracts the proper digit from such location, and presents such digit to a portion of the processor program which controls the transmission of the multifrequency form of the digit.

It is assumed that the digits stored in the trunk register comprise the ten digits of a telephone dial code in which three digits comprise the area code, three more digits comprise the office code, and the remaining four digits comprise the subscriber code. Each digit is stored in the trunk register location of the memory 17 as a four-bit binary coded character. These characters in storage can be schematically represented by the diagram in FIG. 11, which includes three words. The first word is designated WORD+0 and includes the first five characters, while the second word designated WORD+1 includes the remaining five characters. A third word designated WORD+2 includes in the right-most character position a binary coded character which represents the total number of digits which have been sent out from, or received into, the register for a particular unpacking or packing sequence. WORD+2 advantageously also includes additional bits that are to be utilized for other purposes.

In FIG. 11 the words are illustrated in the 20-bit processor word size. It will be recalled from the previous discussions of memory organization and addressing that WORD+0 and WORD+1 are the two halves of a full 40-bit memory word, and WORD+2 is one 20-bit half of the next full-word location in memory. The processor words are illustrated in the form shown in FIG. 11 because in that form it is conceptually easier to follow the essentials of the packing and unpacking operations.

It is assumed that the unpacking program will place the digits to be transmitted in temporary storage in the X register 21 prior to outpulsing. The memory address WORD+0 is assumed to be stored in the F register 22 and represents the first word location in the WORD block of storage in memory 17. The unpacking program sequence for one digit is presented in Table I, and documentation thereof follows the table. A programmer writes the listing of Table I and an assemble program for the data processing machine translates the list into binary machine language in the usual manner.

TABLE I.—UNPACK REGISTER

| Location | Operation | Address, Index, Function |
|---|---|---|
| | MY | 2,F,M4Q0 |
| | EXC | TABL,YA |
| | YM | 2,F,M4Q0 |
| | WY | −11,,SYC |
| | TZ | MP1 |
| | T | MP2 |
| TABL+0 | NøP | |
| TABL+2 | MX | 0,F,M4Q16 |
| TABL+4 | MX | 0,F,M4Q12 |
| TABL+6 | MX | 0,F,M4Q8 |
| TABL+8 | MX | 0,F,M4Q4 |
| TABL+10 | MX | 0,F,M4Q0 |
| TABL+12 | MX | 1,F,M4Q16 |
| TABL+14 | MX | 1,F,M4Q12 |
| TABL+16 | MX | 1,F,M4Q8 |
| TABL+18 | MX | 1,F,M4Q4 |
| TABL+20 | MX | 1,F,M4Q0 |

The first command in an MY instruction which is the MR type of instruction discussed in connection with FIG. 10. It is utilized to transfer a part of the contents of a memory location into the index register Y. A twist on the usual address-plus-index approach is used in this instruction. The programmer inserts in the address field a "convenience address" which is in reality an index that he desires to combine with an address appearing in a register. The address here is in the F register and the index supplied by the programmer is "2." Since WORD+0 is stored in register F, the memory location which is addressed is WORD+2 because WORD+0 is complemented in circuit 43, as previously described, and then subtracted from 2 to produce WORD+2. That location contains the count of digits which have already been transmitted.

The count word is brought into the main control 16, for use as an index; and it is passed through the shift or rotate circuit 39. The Q0 in the function field of the instruction means zero rotation so no transverse coupling of the information bits is performed in circuit 39. However, in the wired mask 40 all bits of the word except the right-most four bits are masked out as indicated by the M4 designation in the function field of the instruction. These four bits are then coupled through logic circuit 41, bus 26, and delay register 34 to the Y index register 24. Thus, the digit count has been moved from memory into the Y register.

The EXC operation code identifies an instruction which causes the execution of a further instruction found in the memory location TABL as indexed by the contents of the Y register. All instructions occupy full 40-bit memory word locations which have only even numbered addresses, as previously mentioned. Accordingly, the EXC operation code causes decoder 32 to activate the one-bit rotate circuit 43 to double the index from the Y register on each indexing operation so that only full-word locations are addressed. The A following the Y in the instruction causes the decoder 32 to set up gating arrangements for causing the index to be incremented automatically as already described. Thus, the contents of the Y register are incremented in steps of one as successive digits up to ten in number are processed. Those same contents are doubled and used for indexing at each step to define the locations 2,4,6 . . . 20 in TABL as shown in Table I.

TABL is the first address of a block of memory locations beginning with the location TABL+0 and constituting a table of instructions. At the TABL+0 location the NφP code is stored to indicate no operation, and this simply provides an indexing base for reference to other instructions to be located in the memory block. In this particular program all of those instructions are MX instructions which move the contents of the memory from the indexed address indicated into the X register with the indicated masking and rotating operations being performed as such information is transmitted through the tandem operation circuit 38. In the first five MX instructions the indexed address is simply the contents of the F register, and in the second five MX instructions it is the sum of one plus the contents of the F register. Thus, the TABL instructions automatically determine which memory word is being considered. A four-bit mask is also provided by each instruction as indicated by the M4 designation in the function field of each.

The amounts of rotation provided by the instructions in the table are different as can be seen by the various Q designations in the function fields thereof, and each such rotation represents a crosscoupling to a different character location in a word of the schematic representation of FIG. 11. Thus, the TABL address in the EXC instruction, when indexed by the digit count content in the Y register, selects the one of the MX instructions which is executed to place the outgoing digit in the correct character position in the X register when it is withdrawn from the trunk register location in memory 17.

Following the execution of each MX instruction in TABL, the control automatically takes the next sequential instruction following the execute instruction EXC. This is the YM instruction which places the contents of the Y register in the memory location 2 as indexed by the contents of the F register, i.e., in the memory location WORD+2, as previously indicated in connection with the MY instruction. During the transmission of the contents of the Y register back to memory access register 28, the M4Q0 code in the function field causes all bits but the right-most four to be masked out in the insertion mask 37. Thus, four bits are passed to the memory without shifting or rotation. This puts the incremented digit count into memory at WORD+2 as shown in FIG. 11.

After the index has been stored in memory, the WY instruction initiates a test procedure to determine whether or not all digits have been unpacked. The contents of the Y register are complemented in rotate circuit 43 and subtracted from −11 under the control of the WY instruction. The difference is a piece of data that is sent back to the Y register via delay register 34. Decision logic 45 causes appropriate registrations on flip-flop circuits 54 and 55, as previously mentioned, for that difference data. The TZ instruction is a transfer instruction which initiates a conditional transfer on the last contents of delay register 34, namely, on a test of the mentioned difference data. If that data is not equal to zero, control goes to the unconditional transfer instruction T which returns to instruction MP2 in the main program to outpulse the digit unpacked and thereafter repeat the described unpacking routine with the new digit count in the memory location WORD+2. If the data is equal to zero, the digit just considered was the tenth, the unpacking is complete, and control returns to the main program as indicated by MP1. The main program then causes that last digit stored in the X register to be outpulsed in multifrequency form.

Substantially the same program can also be used for packing incoming dial pulse digits into the proper character locations of the trunk register. The only difference would be that the operation code for the instructions in the transfer table TABL would be XM instructions instead of MX instructions. In other words, the instructions in the table would be adapted to transfer digit information from the X register into the trunk register in memory instead of transferring information from the trunk register in memory into the X register. The unpacking and packing programs demonstrate the flexibility of the control 16 for extracting bit groups of desired size from a larger word group in the memory access register. It is not necessary to rewrite the machine to accommodate a different character size. It is only necessary for the programmer to specify a different sized mask by the M designation in the function field of the instruction, and to specify an appropriate amount of rotation. The program also demonstrates the flexibility of the tandem operation circuit 38 in that different combinations of the signal modifications there presented may be utilized. Thus, for example, the MY instruction utilizes only the logic operation of circuit 41 when performing the address indexing function even though the address signals may flow through all other parts of circuit 38 without change. Later the same instruction utilizes only the masking when unpacking a particular character group from an entire word. The MX instructions utilize both the rotating and the masking functions in the second cycle pass of information through circuit 38.

The next program to be considered is a short program for generating even parity over an illustrative group of eight bits. This parity program further demonstrates the flexibility of the tandem operation circuit 38 by illustrating one situation in which all three of the shift or rotate, mask, and logic functions in the circuit 38 are advantageously utilized in tandem on a single pass of information through the circuit 38.

For example, in telephone offices employing automatic message accounting, billing information is accumulated and then stored on a magnetic tape. Even parity is generated over the bits of the billing information, assumed for convenience here to be eight bits of information; and the resulting single even parity bit is stored along with the billing information as a ninth bit on the tape. Consider the point in time at which the eight bits of billing information are stored in the right-most bit positions of a word location in memory 17 prior to entry of such information upon the tape. It is assumed first that these eight bits of information have been unpacked from the storage location in memory 17 and placed in the X register by means of an MX instruction of the type already described. Even parity is then generated on the eight-bit content of the X register in accordance with the program hereinafter described.

The operating method employed for generating even parity involves operations in which one-half of a bit group of interest is EXCLUSIVE ORed against the other half so that the bit group of interest after the EXCLUSIVE ORing operation is one-half of the original size. The operation is successively repeated until a one-bit result is obtained, and that one bit is the even parity bit which is to be stored with the eight bits of billing information. The parity generating program listing follows in Table II.

TABLE II.—GENERATE EVEN PARITY

| Operation | Address, index, function |
|---|---|
| XY | HR4,,EX. |
| YY | HR2,,EY. |
| YY | HR1,,EY. |
| YX | M9HL8,,$\phi$X. |
| T | MP. |

All of the instructions, except the transfer instruction, in the program of Table II are of the RR type considered in connection with FIG. 10. They involve movement of information from one index register to another or from the one index register back to the same register. In these instructions no memory address location need be specified; and, accordingly, the address field of the instruction is advantageously employed to specify additional arguments for controlling signal modification in the operation circuit 38.

The XY instruction calls for the contents of the X register to be looped around through the operation circuit 38 to the Y register in the manner previously described for register to register movements. The HR4 designation in the address field of the instruction causes the decoder 32 to control the shift or rotate circuit 39 so that the content of the X register is shifted to the right by four bit positions as it is transmitted through circuit 38. The EX designation in the function field of the instruction also causes the content of the X register to be connected through the argument bus 42 to the logic circuit 41 where it is then used as an argument for an EXCLUSIVE OR operation performed with the shifted form of the X register content. The result is placed in the Y register and includes only four bits of interest because the shift caused the last four of the eight bits to be EXCLUSIVE ORed with the first four.

The YY instruction right shifts the contents of the Y register by two bit positions and EXCLUSIVE OR's the results with the unshifted contents of the Y register. A shift of only two bit positions was required to EXCLUSIVE OR the two halves of the four bits of interest against one another. A second YY instruction repeats the EXCLUSIVE ORing operation after a one-bit shift of the contents of the Y register and produces a one-bit result of interest. Since no masking operations have been utilized so far there may be extraneous ONES or ZEROS in Y register bit positions other than the right-most single bit position, which is now the only one of interest. Masks were not required because such extraneous information is eliminated by the one mask in the next instruction. However, if desired, the same result could be achieved by inserting in the address fields of the first three instructions M4, M2, and M1 to mask out all but the bits of interest at each step.

The YX instruction is adapted to take the single even parity bit which has just been produced and pack it into the X register in the ninth bit position so that it may be stored on tape along with the eight bits of billing information. To achieve this objective the HL8 designation in the address field of the YX instruction left shifts the contents of the X register by eight bit positions as it is transmitted through the operation circuit 38. This moves the single parity bit from the first bit position into the ninth bit position and places ZEROS in all of the first eight bit positions as described in the mentioned Muir sole application. The M9 designation, which also appears in the address field of the YX instruction causes a nine-bit, right adjusted, wired mask to be imposed on the operation circuit 38 so that information in only the right-most nine bits is coupled through to the logic circuits 41; and ZEROS are coupled through in all of the other bit positions. This mask thus eliminates the previously mentioned extraneous information. The $\phi$X designation in the function field of the YX instruction causes the logic circuit 41 to OR the output of the wired mask 40 with the unmodified eight-bit contents of the X register. The result of this operation is to place the single parity bit in the ninth bit position of the word and replace the word in the X register.

The T instruction unconditionally transfers control back to the main program which then causes the contents of the X register to be stored on the magnetic tape of the automatic message accounting equipment, not shown.

Thus, the four operating instructions of the parity generating program are able to generate even parity over an eight-bit group and pack the single parity bit in a predetermined bit position of the word location containing the eight bits. This involves a total of nine shifting, masking, and ORing operations which would normally be performed by at least eight instructions in data processing equipment of the prior art. The reduction in the number of instructions and the consequent reduction in gating hardware which is implicit therein is made possible by the employment of the tandem operation circuit 38 which performs multiple signal modifications during each transmission of information therethrough.

Only a few instructions have been indicated herein since these demonstrate the type of capabilities possessed by the present invention. Many others are, of course, possible.

Although the present invention has been described with reference to particular embodiments and applications thereof, it is to be understood that further modifications and applications that will be obvious to those skilled in the art are included within the spirit and scope of the invention.

What is claimed is:

1. A data processing machine comprising
first and second electric circuit means,
an electric circuit bus including in tandem plural signal modification circuits each performing a different type of modification and each having plural selectable operating modes for its type of modification,
means supplying control signals to said modification circuits to select an operating mode for each of them so that at least two different types of signal modification are performed upon signals transmitted through said bus, said control signals being independent of signals transmitted through said bus, said modification circuits in their respective selected modes providing a continuous electric signal current conductive path through said bus, and
means connecting said bus to transmit information signals between said first and second circuit means.

2. A data processing machine comprising
first and second electric circuit means,
an electric circuit bus including in tandem plural electric signal modification circuits, each of said modification circuits performing a different type of modification and each having plural selectable operating characteristics for its type of modification, means simultaneously supplying control signals to plural ones of said modification circuits to select an operating characteristic for each of them, said control signals being independent of signals transmitted through said bus, said modification circuits in their respective selected characteristics providing a continuous electric signal transmission path through said bus to accomplish all of the corresponding modifications on a single transmission of a signal through said bus, and means connecting said bus for transmitting electric signals between said first and second circuit means.

3. A data processing machine for processing multibit information words in bit-parallel fashion, said machine comprising an electric circuit bus including in tandem plural electric signal modification circuits, each performing a different type of modification and each having plural selectable operating modes for its type of modification, memory means having data and an instruction program stored therein, means reading out successive instructions in said program, and instruction decoding means responsive to a single one of said instructions for supplying control signals to said modification circuits to select an operating mode for each of them, said modification circuits in their respective selected modes providing a continuous electric signal path through said bus for performing the plural selected signal modifications in response to said single instruction and on a single transmission of signal through said bus.

4. The data processing machine in accordance with claim 3 in which said modification circuits comprise circuits for shifting or rotating signals representing said multibit words selectable amounts and directions, for masking selectable numbers of the bits of said signals to eliminate signal information in predetermined bit positions, and for performing a selectable one of plural logic operations, and means are provided to supply augment signals to said logic operation performing circuits in response to said single instruction.

5. A data processing machine comprising first, second, and third electric circuit buses, a fourth electric circuit bus including in tandem plural electric signal modification circuits, each modification circuit performing a different type of modification and each having plural selectable operating modes for its type of modifications, at least one of said modification circuits requiring both input signals and argument signals to perform its modification function, memory means having data and an instruction program stored therein, said program including a plurality of machine operating instructions adapted to be utilized in a predetermined sequence, a buffer access register in which signals are stored after read-out from and before write-in to said memory, instruction decoding means responsive to an instruction in said access register to supply control signals to said modification circuits to select an operating mode for each of them, said modification circuits in their respective selected modes providing a continuous non-time-gated electric signal path through said fourth bus, means connecting said fourth bus to transmit information signals from said first bus to said second bus, a plurality of signal storage means, means connecting said storage means between said first and second buses for storing signals between program instructions pertaining thereto, means including said third bus coupling the outputs of at least a portion of said storage means to provide said argument signals to said one modification circuit, means coupling the output of said register to said first circuit bus, means controlled by said decoding means coupling signals from said second bus to said access register, the last-mentioned means including an insertion mask circuit, and means supplying mask control signals to said insertion mask from said third bus.

6. A data processing machine comprising memory means containing data words and program instruction words for controlling the operation of said machine, a memory access buffer register for storing words being read out of said memory and for storing words to be written into said memory, operating circuit means including in tandem therein plural signal operation circuits including in the order named from the input of such means to the output thereof a shift or rotate circuit, a mask circuit, and a selectable logic circuit, a signal delay register, plural data registers having the inputs thereof connected in multiple to the output of said delay register, first bus circuit means connecting the outputs of said data registers to the input of said operating circuit means, second bus circuit means coupling the output of said operating circuit means to the input of said delay register, means connecting the output of said access buffer register to said first bus circuit means, means connecting said second bus circuit means to the input of said buffer register whereby said connecting means compels signal transmissions between said buffer register and said data registers and between any two of said data registers to be accomplished through said operating circuit means, means connecting the outputs of said data registers to said selectable logic circuits for providing argument signals to the last-mentioned circuits from said data registers, and program instruction decoding means responsive to said instruction words and controlling signal transmission among said data registers and between said memory and said data registers all via said operating circuit means, said decoding means further controlling during each signal transmission through said operating circuit means the extent of signal shifting or rotating, the extent of masking, and the particular one of said selectable logic circuits to be utilized.

7. In a data processor in which information is processed in accordance with a program, means controlling the operation of said processor in accordance with a predetermined program of instructions, signal operating circuit means in which multiple signal modifications are performed in tandem succession on a continuous flow-through basis for a given signal, means responsive to each of said instructions gating information signals to the input of said operation circuit means and thereafter gating signals from the output of such circuit means, and means further responsive to each of said instructions controlling said signal operation circuit means to fix the characteristic of each of said multiple modifications for each different signal transmission in said circuit means.

8. In a data processor for manipulating multibit information words in bit-parallel fashion, memory means,
an access register,
circuit means coupled to said register for performing different selectable logic operations on output signals from said register,
internal register means,
means connecting said selectable logic circuit means to comprise a common path for applying information from said access register means to said internal register means and from said internal register means to said access register means at different times, said path including parallel paths for each bit of a word, and
means unpacking information bit groups of smaller-than-word size from one of said words, said unpacking means comprising in tandem in said common path with said logic circuit means a circuit for shifting the positions of information bits in a word, and bit path masking means for selectably inhibiting information transmission in at least a portion of such bit paths.

9. A data processing machine comprising
means providing input and output for processing words,
plural accumulators,
a single signal operation circuit for performing plural selectable signal modifications,
means coupling input processing words from said providing means to selectable ones of said accumulators through said operation circuit,
means coupling output processing words from selectable ones of said accumulators to said providing means through said signal operation circuit, and
means controlling the selection of said signal modifications and of said accumulators for input and output processing words.

10. A data processing machine comprising
plural signal word registration means each having input and output connections,
a signal operation circuit including plural means connected in tandem for performing different selectable signal modifications, said plural means being combinational in form so that the tandem output thereof is dependent upon the maintenance of input signals to said operation circuit as well as argument signals to said plural means,
means coupling input signals to a selectable one of said registration means through said signal operation circuit,
means coupling output signals from a selectable one of said registration means through said signal operation circuit,
additional means selectably coupling the output of at least one of said registration means to provide an argument signal for at least one of said signal modification means, and
means controlling the selection of said signal modifications and of said registration means.

11. A data processing machine comprising
plural signal word registration means each having input and output connections,
a signal operation circuit including plural means connected in tandem for performing different selectable signal modifications, said plural means being combinational in form so that the tandem output thereof is dependent upon the maintenance of input signals to said operation circuit as well as argument signals to said plural modification means,
means coupling input signals to a selectable one of said registration means through said signal operation circuit,
means coupling output signals from a selectable one of said registration means through said signal operation circuit,
additional means selectably coupling the output of any one of said registration means to provide an argument signal for at least one of said signal modification means, and
means controlling the selection of said signal modifications and of said registration means.

12. A data processing machine comprising
memory means storing at predetermined addressable locations therein a program of instructions for controlling the operation of said machine, said program including a subroutine program at the completion of which program control returns to an instruction at a predetermined address in said memory means,
plural signal accumulators, one of said accumulators being a program address register supplying addresses for initiating the read-out of predetermined ones of said instructions from said memory means,
means incrementing the contents of said address register following the utilization of an address stored therein,
means controlling said data processing machine in accordance with instructions read out of said memory means, said controlling means including means causing the output of said address incrementing means to be coupled to an additional one of said accumulators at the beginning of said subroutine, and
means responsive to the last operation of said subroutine addressing said memory from said additional accumulator and coupling the contents of such accumulator to said address register.

13. A data processing machine comprising
memory means storing at predetermined addressable locations therein a program of instructions for controlling the operation of said machine, said program including a first subroutine program which includes a second subroutine program, each of said subroutine programs requiring at the completion thereof return to a different instruction stored in said memory means,
plural signal accumulators, one of said accumulators being a program address register supplying addresses for initiating the read-out of predetermined instructions from said memory means,
means incrementing the contents of said address register following the utilization of a particular address stored therein,
means controlling said data processing machine in accordance with instructions read out of said memory means, said controlling means including means causing the output of said address incrementing means to be coupled to different additional ones of said accumulators at the beginning of each of said subroutines, and
means responsive to the last operation of each of said subroutines addressing said memory from the corresponding one of said additional accumulators and coupling the contents of such accumulator to said address register.

14. In a data processing machine,
means providing input and output for information signals comprising multibit information words,
plural signal accumulator means,
circuit means for providing plural selectable modifications of signals transmitted therethrough,
signal masking means inhibiting transmission of all word signal bits except selectable ones thereof,
means coupling signals from said accumulator means through said circuit means and said masking means to said output providing means,
means controlling the selection of said accumulator means, said signal modifications, and the transmission pattern of said masking means for each signal transmission in said coupling means.

15. An information processing machine comprising
means supplying multibit information words,
a signal operation circuit modifying said information words and including plural circuits adapted to perform different information word modifications in a combinational mode as information word signals are transmitted therethrough as a first combinational argument, means supplying a second combinational argument to said circuit, and means controlling said modifications in said operation circuit to include on each transmission therethrough operations from at least two of the groups of operations:

(1) Selectably shaft or rotate information bit position in said first argument by a selectable amount and in a selectable direction;

(2) Mask out all bits except a selectable bit group size in a predetermined position in said first argument;

(3) Selectably perform with said first and second arguments one of the operations of subtraction, logical AND logical OR, or logical EXCLUSIVE-OR.

16. The information processing machine in accordance with claim 15 in which said means supplying said second argument includes plural argument signal modification means selectably complementing an argument signal, rotating an argument signal one bit position, or clamping said argument signal modification means to produce an argument that is the complement of a predetermined number, and said controlling means further controls said argument signal modification means selection.

17. An information processing machine comprising means supplying signals representing multibit information words, a signal operation circuit modifying said information word signals and including plural signal modification circuits adapted to perform plural operations in a combination mode as said word signals are transmitted therethrough, means controlling the specific operations performed by each of said modification circuits, means supplying multibit argument signals to at least one of said modification circuits for augmenting said combinational operation mode, such argument supplying means including means selectably modifying predetermined arguments by complementing, performing a one-bit rotation, or clamping the argument to a predetermined numerical configuration, and said controlling means further controlling the selection of said argument modifying means operation.

18. A programmed information processing machine comprising means supplying a program of instructions in sequence, means decoding said instructions to produce corresponding electric signals for controlling said machine, means supplying multibit information word signals, a signal operation circuit modifying said information word signals and including plural signal modification circuits adapted to perform plural operations in a combinational mode as said word signals are transmitted therethrough to produce data signals, means responsive to said electric signals controlling the specific operations performed by at least one of said modification circuits, means supplying instruction-specified signals to at least one of said modification circuits for controlling said combinational operation mode thereof, means supplying argument signals to one of said modification circuits for modification of a signal word, said argument signals being said data signals produced from a previously transmitted signal word, said argument signal supplying means including means selectably modifying such argument signal by complementing, a one-bit rotation, or both complementing and a one-bit rotation, and said controlling means further controlling the selection of said additional argument modifying means operation in response to said decoding means electric signals.

19. A data processing machine comprising signal registration means, plural accumulator means including plural signal accumulation registers, an information operation circuit selectively connectable between the output of said registration means and the input of said accumulator means, between the output of said accumulator means and the input of said registration means, or between the output and input of said accumulator means, means supplying machine instructions defining a source and a destination for an information transfer among said registration means and said registers in said machine, said instructions selecting the connection of said operation circuit, said operation circuit including plural signal modification means actuatable in different combinations for modifying signals during the movement thereof between said source and destination, and means responsive to said instructions selecting said combinations of signal modification means.

20. A data processing machine comprising means providing input and output for processing word signals, plural signal accumulators, a signal operation circuit for performing plural selectable signal modifications, means coupling input processing word signals from said providing means to selectable ones of said accumulators through said circuit, said coupling means comprising at the output of said operation circuit a delay register for holding said circuit output signals for a predetermined time interval before coupling to a selected one of said accumulators, means coupling output processing word signals from selectable ones of said accumulators to said providing means through said signal operation circuit, and means controlling the selection of said signal modifications and of said accumulators for input and output processing words.

21. The data processing machine in accordance with claim 20 in which means coupled to said delay register indicate predetermined characteristics of processing word signals in such register, and additional means couple the output of said indicating means to said controlling means.

22. A data processor comprising memory means including addressable storage locations, means controlling the operation of said processor in accordance with a predetermined program of instructions stored in said memory means, each of said instructions including portions defining the type of operation to be performed by said processor and the address in said memory means of information to be used in said operation, circuit means in which multiple signal modifications are performed in tandem succession on signals applied thereto, a delay register coupled to the output of said circuit means for storing the output thereof for a predetermined time interval, means coupled to said delay register for indicating predetermined characteristics of signals in said delay register, means responsive to said instructions gating information signals to said delay register through said circuit means, plural signal accumulator means, one of which is employed as a program address register for storing the address in said memory means of the next instruction to be executed, means responsive to a predetermined combination of said characteristics coupling the contents of said delay register to one of said accumulator means and coupling the address portion of the instruction being executed to said program address register, and means responsive to each of said instructions controlling said circuit means to fix the characteristic of each of said multiple modifications for each different signal transmission in said circuit means.

23. A data processing machine comprising two signal processors, each of said processors including plural accmulators, a signal operation circuit for performing selectable signal modifications, means coupling input signals to selectable ones of said accumulators through said signal operation circuit, a delay register in said coupling means for holding the output of said operation circuit for a predetermined time interval prior to coupling to a selected accumulator, and means controlling the selection of said signal modifications and of said accumulators, means matching signal conditions at predetermined corresponding points in said two processors, and means inhibiting said coupling of signals from said delay register to said accumulators in response to the detection of a mismatch in said matching means.

24. A data processing machine comprising means supplying input signals, plural signal accumulator means, signal operating circuit means, accumulator output receiving means, and means simultaneously coupling signals from said supplying means through said operating circuit to a first one of said accumulator means and from a second one of said accumulator means to said output receving means.

25. A programmed data processing machine for multibit processing word signals and comprising a signal operation circuit including plural parallel signal bit transmission paths for performing multiple modifications in tandem upon multibit electric signals transmitted therethrough, said circuit comprising means shifting bit path positions of multibit electric signals applied thereto, means masking out signal transmission in selectable ones of said bit transmission paths, and an OR logic means, a plurality of registers for registering n-bit electric signals representing processing words. said registers being selectably connectable to said operation circuit, means supplying a program of instructions in the form of signal manifestations for controlling the selection of said modifications and of certain ones of said registers for each word applied to said circuit, means responsive to said instructions sequentially coupling signals from the output one of said registers through said operation circuit to the input of one of said registers a plurality of times $r$ until $n/2r$ equals 1, the first of said times the coupling being from a first of said registers to a second one thereof and the remaining times from said second register to said second register, said sequential coupling means thereafter coupling signals through said circuit from said second register back to said first register, means responsive to said instructions controlling said shifting means to right shift said signals $n/2r$ bit positions on each of said couplings and controlling said masking means to mask all except the right-most $n/2r$ bits, and further means responsive to said instructions controlling said shifting and masking means on said coupling from said second register to said first register to produce a left shift of $n+1$ bits and a mask of all except the right-most $n+1$ bits.

References Cited

UNITED STATES PATENTS

| | | | |
|---|---|---|---|
| 3,166,668 | 1/1965 | Marsh | 340—172.5 X |
| 3,061,192 | 10/1962 | Terzian | 340—172.5 |
| 3,157,779 | 11/1964 | Cochrane | 340—172.5 |
| 3,229,260 | 1/1966 | Falkoff | 340—172.5 |
| 3,235,844 | 2/1966 | White | 340—172.5 |

OTHER REFERENCES

Applicant Citation: R. M. Brown et al.: IEEE Transactions on Electronic Computers, "CSX–1 Computer," pp. 247–250, June 1964.

"Univac 1107 Memory Computer" by Sperry Rand Corp., 1961, page 7.

ROBERT C. BAILEY, *Primary Examiner*.

P. R. WOODS, *Assistant Examiner*.

UNITED STATES PATENT OFFICE

CERTIFICATE OF CORRECTION

Patent No. 3,370,274 February 20, 1968

Arthur W. Kettley et al.

It is hereby certified that error appears in the above numbered patent requiring correction and that the said Letters Patent should read as corrected below.

Column 27, line 46, for "augment" read -- argument --.

Signed and sealed this 29th day of April 1969.

(SEAL)
Attest:

Edward M. Fletcher, Jr.
Attesting Officer

EDWARD J. BRENNER
Commissioner of Patents